(12) United States Patent
Barrios et al.

(10) Patent No.: US 10,023,768 B2
(45) Date of Patent: *Jul. 17, 2018

(54) ARTICLE COMPRISING PRESSURE-SENSITIVE ADHESIVE STRIPES

(71) Applicant: 3M INNOVATIVE PROPERTIES COMPANY, St. Paul, MN (US)

(72) Inventors: Carlos A. Barrios, Woodbury, MN (US); James L. Bries, Cottage Grove, MN (US); Gary W. Maier, Roberts, WI (US); Tyler J. Rattray, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/901,271

(22) PCT Filed: Jun. 12, 2014

(86) PCT No.: PCT/US2014/042042
§ 371 (c)(1),
(2) Date: Dec. 28, 2015

(87) PCT Pub. No.: WO2014/209622
PCT Pub. Date: Dec. 31, 2014

(65) Prior Publication Data
US 2016/0376471 A1 Dec. 29, 2016

Related U.S. Application Data

(60) Provisional application No. 61/838,504, filed on Jun. 24, 2013.

(51) Int. Cl.
*C09J 7/38* (2018.01)
*C09J 7/40* (2018.01)
(Continued)

(52) U.S. Cl.
CPC . *C09J 7/38* (2018.01); *C09J 7/29* (2018.01); *C09J 7/383* (2018.01); *C09J 7/385* (2018.01);
(Continued)

(58) Field of Classification Search
None
See application file for complete search history.

(56) References Cited

U.S. PATENT DOCUMENTS

| 4,386,998 A | 6/1983 | McIntyre |
| 5,082,706 A | 1/1992 | Tangney |

(Continued)

FOREIGN PATENT DOCUMENTS

| JP | H06-184502 A | 7/1994 |
| JP | 2003-313520 A | 11/2003 |

(Continued)

OTHER PUBLICATIONS

International Search Report for PCT International Application No. PCT/US2014/042042, dated Oct. 23, 2014, 4 pages.

*Primary Examiner* — Frank D Ducheneaux
(74) *Attorney, Agent, or Firm* — Kenneth B. Wood

(57) ABSTRACT

An article including a release liner with an adhesive layer disposed thereon, the adhesive layer including a plurality of stripes of a first pressure-sensitive adhesive and of a second pressure-sensitive adhesive, arranged in a generally alternating pattern. The first pressure-sensitive adhesive is a silicone-based pressure-sensitive adhesive that includes a silicone block copolymer elastomer comprising hard segments that each comprise at least one polar moiety, and the second pressure-sensitive adhesive is an organic polymeric pressure-sensitive adhesive.

19 Claims, 3 Drawing Sheets

(51) Int. Cl.
  *C09J 7/29* (2018.01)
  *C09J 183/08* (2006.01)
  *C09J 183/10* (2006.01)
  *C09J 125/04* (2006.01)
  *C09J 107/00* (2006.01)
  *C09J 133/04* (2006.01)
  *C09J 125/16* (2006.01)

(52) U.S. Cl.
  CPC ............... *C09J 7/387* (2018.01); *C09J 7/401* (2018.01); *C09J 7/403* (2018.01); *C09J 107/00* (2013.01); *C09J 125/16* (2013.01); *C09J 133/04* (2013.01); *C09J 183/08* (2013.01); *C09J 183/10* (2013.01); *C09J 2201/40* (2013.01); *C09J 2201/606* (2013.01); *C09J 2201/618* (2013.01); *C09J 2407/00* (2013.01); *C09J 2425/00* (2013.01); *C09J 2433/00* (2013.01); *C09J 2453/00* (2013.01); *C09J 2483/00* (2013.01); *C09J 2483/005* (2013.01)

(56) References Cited

U.S. PATENT DOCUMENTS

| | | | |
|---|---|---|---|
| 5,094,788 A | 3/1992 | Schrenk |
| 5,110,530 A | 5/1992 | Havens |
| 5,110,890 A | 5/1992 | Butler |
| 5,120,484 A | 6/1992 | Cloeren |
| 5,214,119 A | 5/1993 | Leir |
| 5,461,134 A | 10/1995 | Leir |
| 5,512,650 A | 4/1996 | Leir |
| 5,578,381 A | 11/1996 | Hamada |
| 5,677,376 A | 10/1997 | Groves |
| 5,851,566 A | 12/1998 | Potjer |
| 6,231,962 B1 | 5/2001 | Bries |
| 6,352,758 B1 | 3/2002 | Huang |
| 6,407,195 B2 | 6/2002 | Sherman |
| 6,441,118 B2 | 8/2002 | Sherman |
| 6,569,521 B1 | 5/2003 | Sheridan |
| 6,669,887 B2 | 12/2003 | Hilston |
| 6,803,076 B2 | 10/2004 | Loukusa |
| 6,846,893 B1 | 1/2005 | Sherman |
| 7,153,924 B2 | 12/2006 | Kuepfer |
| 7,371,464 B2 | 5/2008 | Sherman |
| 8,344,037 B2 | 1/2013 | Yamada |
| 2002/0108564 A1 | 8/2002 | Gruenewald |
| 2008/0233848 A1 | 9/2008 | Nordstrom |
| 2009/0162595 A1 | 6/2009 | Ko |
| 2009/0229732 A1 | 9/2009 | Determan |
| 2009/0291279 A1* | 11/2009 | Schroeer ................... C09J 7/38 428/214 |
| 2011/0071270 A1 | 3/2011 | Hays |
| 2011/0126968 A1 | 6/2011 | Determan |
| 2011/0171430 A1 | 7/2011 | Mayers |
| 2012/0148791 A1 | 6/2012 | Yamanaka |
| 2012/0271025 A1 | 10/2012 | Hays |
| 2013/0060209 A1 | 3/2013 | Tyler |
| 2013/0075027 A1 | 3/2013 | Sheridan |

FOREIGN PATENT DOCUMENTS

| | | |
|---|---|---|
| JP | 2009-200506 A | 9/2009 |
| WO | WO 2009/089137 A2 | 7/2009 |
| WO | WO 2014-209637 | 12/2014 |
| WO | WO 2014-209895 | 12/2014 |

\* cited by examiner

ARTICLE COMPRISING PRESSURE-SENSITIVE ADHESIVE STRIPES

BACKGROUND

Pressure-sensitive adhesives (PSAs) are widely used for various bonding applications. In particular, stretch-releasable pressure-sensitive adhesive tapes are often used to bond an item to e.g. a surface of a building component. The item can be released from the surface by stretching the adhesive tape, leaving little or no adhesive residue on the surface.

SUMMARY

In broad summary, herein is disclosed an article comprising a release liner with an adhesive layer disposed thereon, the adhesive layer comprising a plurality of stripes of a first pressure-sensitive adhesive and of a second pressure-sensitive adhesive, arranged in a generally alternating pattern. The first pressure-sensitive adhesive is a silicone-based pressure-sensitive adhesive that comprises a silicone block copolymer elastomer comprising hard segments that each comprise at least one polar moiety, and the second pressure-sensitive adhesive is an organic polymeric pressure-sensitive adhesive. Methods of making such an article are also disclosed. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Although terms such as "top", bottom", "upper", lower", "under", "over", "front", "back", "up" and "down", and "first" and "second" may be used in this disclosure, it should be understood that those terms are used in their relative sense only unless otherwise noted. The terms inward, outward, and lateral have particular meanings as defined later herein. The term "adhesive" as used herein means a pressure-sensitive adhesive. As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

DETAILED DESCRIPTION

Glossary

By the "overall area fraction" of a particular adhesive in an adhesive layer is meant the fraction of the total area of the adhesive layer (which total area includes any gaps) that is collectively provided by the stripes of that particular adhesive.

By the "gap area fraction" is meant the fraction of the total area of an adhesive layer that is collectively provided by any adhesive-free gaps in the adhesive layer.

By the "volume fraction" of a particular adhesive in an adhesive layer is meant the fraction of the total volume of the adhesive layer (which total volume includes any gaps) that is collectively provided by the stripes of that particular adhesive.

Figure 1:
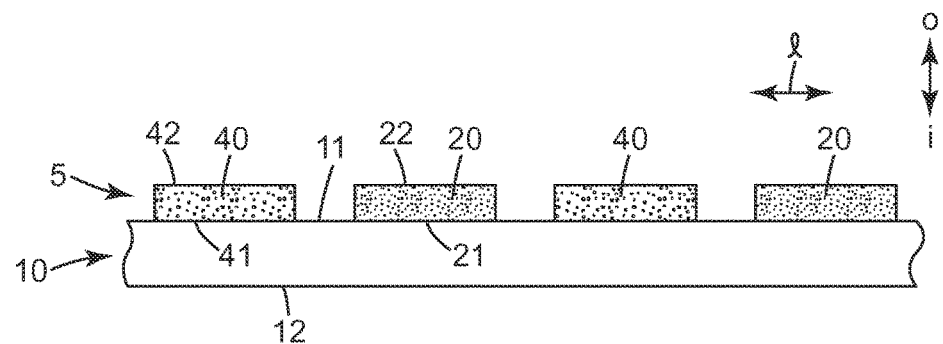
FIG. 1 is a schematic cross sectional slice view of a portion of an exemplary article as disclosed herein.

Shown in FIG. 1 is a schematic cross sectional slice view of a portion of an exemplary article (viewed along the long axis of stripes 20 and 40) as disclosed herein. The article comprises a release liner 10 with a first major surface 11 and a second major surface 12 that faces oppositely from first major surface 11. Release liner 10 comprises a fluorosilicone release surface on first major surface 11 as discussed in detail later herein. Release liner 10 may optionally comprise a release surface, e.g. a fluorosilicone release surface, on second major surface 12. A primary adhesive layer 5 is disposed on first major surface 11 of release liner 10. Adhesive layer 5 comprises a plurality of stripes of a first pressure-sensitive adhesive 20 and of a second pressure-sensitive adhesive 40, arranged in a generally alternating pattern across a lateral extent "l" of release liner 10, as shown in exemplary manner in FIG. 1. (By a lateral direction, and the resulting lateral extent, is meant a direction that is substantially perpendicular to the long axes of the stripes; that is, the direction along which the stripes are arranged, e.g. spaced.). First pressure-sensitive adhesive 20 is a silicone-based pressure-sensitive adhesive that comprises a silicone block copolymer elastomer comprising hard segments that each comprise at least one polar moiety, as discussed in detail later herein. Second pressure-sensitive adhesive 40 is an organic polymeric pressure-sensitive adhesive, as discussed in detail later herein.

As stated above, stripes of pressure-sensitive adhesives 20 and 40 are arranged in a generally alternating pattern. An exemplary version of this is as shown e.g. in FIGS. 1-3, in which the following pattern is found: [40/20/40/20 . . . ]. However, the concept of generally alternating also includes patterns in which any selected stripe (whether of adhesive 20 or 40) can be provided in the form of two or more sub-stripes. For example, one of e.g. stripes 20 or 40 could be provided as two sub-stripes with a gap in between, instead of as a single stripe as shown in FIG. 1. Thus, for example, a generally alternating pattern includes such patterns as [20/(40/40)/20/(40/40) . . . ]; that is, a pattern in which two 40 sub-stripes are followed by a single 20 stripe); and, [(20/20)/(40/40/40) . . . ]; that is, a pattern in which two 20 sub-stripes are followed by three 40 sub-stripes), and so on. In many embodiments, stripes of pressure-sensitive adhesives 20 and 40 will be elongated (e.g., as shown in FIG. 3) so as to comprise long axes, although such long axes do not necessarily have to be strictly linear.

Figure 2:
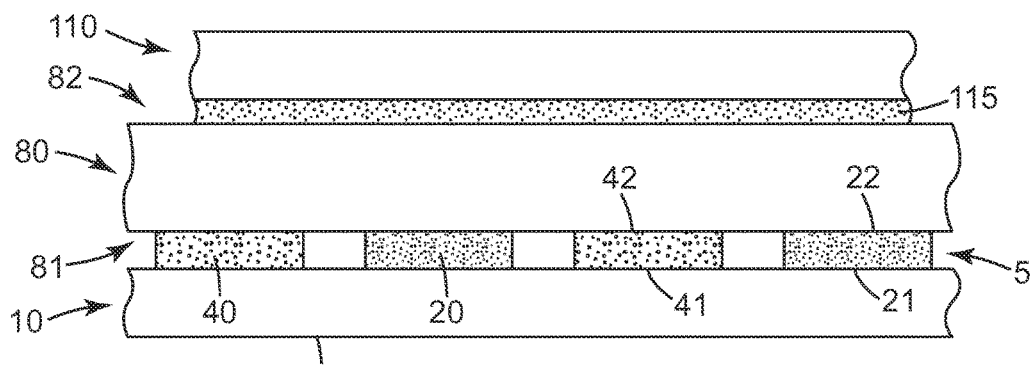
FIG. 2 is a schematic cross sectional slice view of a portion of another exemplary article as disclosed herein.
Figure 3:
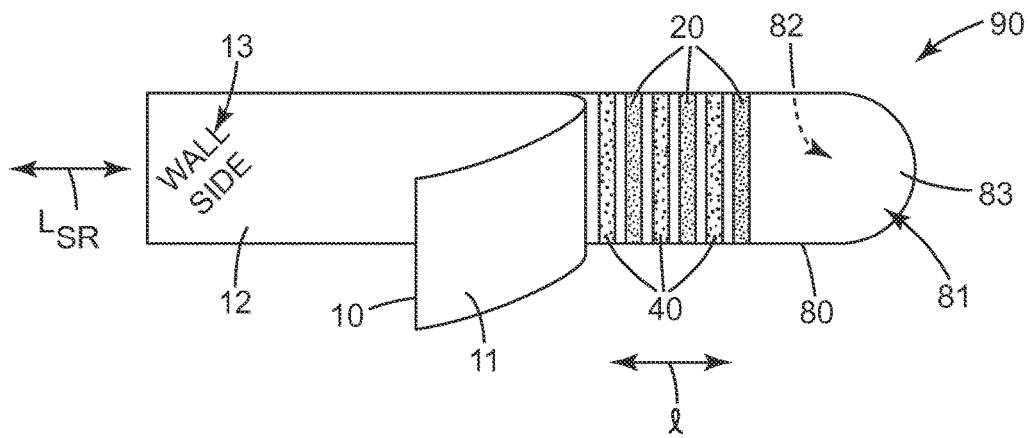
FIG. 3 is a top perspective view of another exemplary article as disclosed herein.

In some embodiments, the disclosed article may comprise a substrate (e.g., a backing such as a tape backing) 80, as shown in exemplary embodiment in FIGS. 2 and 3. In such embodiments, at least selected stripes of the plurality of stripes may each comprise a first major surface that is in contact with the fluorosilicone release surface 11 of release liner 10, and at least selected stripes of the plurality of stripes may each comprise a second, oppositely-facing major surface that is pressure-sensitive-adhesively bonded to first major side/surface 81 of substrate 80. In the illustrated embodiment of FIG. 2, stripes 20 and 40 comprise first major surfaces (21 and 41, respectively) that are in contact with release surface 11 of release liner 10; and, stripes 20 and 40 comprise second major surfaces (22 and 42, respectively) that are bonded to first major side/surface 81 of substrate 80. However, this may not always be the case, as will be appreciated from discussions later herein.

Substrate 80 can comprise e.g. any type of backing that may be suitable for forming any desired type of article, e.g. tape. In particular embodiments, backing 80 may comprise a highly-extensible backing as discussed in detail later herein, so that the provided article can function as a stretch-releasable adhesive tape. In some embodiments, a secondary pressure-sensitive adhesive layer 115 may be provided on the secondary (opposite) side of tape backing 80 from primary pressure-sensitive adhesive layer 5. Such an arrangement can provide a so-called double-faced adhesive tape. If desired, a secondary release liner 110 may be provided on secondary side 82 of tape backing 80, as shown in exemplary embodiment in FIG. 2.

In some embodiments, tape backing 80, and primary and secondary adhesive layers 5 and 115, can collectively provide a double-faced stretch-releasable adhesive tape. Such articles are often used to removably attach items to e.g. building components such as walls and the like. FIG. 3 thus shows an exemplary stretch-releasable article 90, comprising a highly extensible backing 80 with stripes 20 and 40 of first and second adhesives disposed on a portion thereof in a generally alternating pattern. Article 90 further comprises a tab portion 83 (e.g. a portion of backing 80 that does not have any adhesive disposed thereon), which tab portion 83 can be grasped and pulled to activate the stretch-release property of the article. In many embodiments, such a stretch-releasable article may comprise an elongate length with a long axis $L_{SR}$, which long axis serves as the axis along which the article can be pulled to activate the stretch-release property. As can be seen in FIG. 3, in some embodiments the individual stripes 20 and 40 of the first and second adhesives can each have a long axis that is oriented generally, substantially, or even strictly perpendicular to the long axis $L_{SR}$ of the elongate length of stretch-releasable article 90 (with the latter case being shown in FIG. 3). It will be appreciated that such stretch-releasable articles are customarily mounted to a wall so that the long axis of the article is aligned vertically (with respect to the earth's gravity) so as to most advantageously bear the weight of an item to be supported by the article. It is thus noted that the functioning described herein may be obtained even when the individual stripes of adhesive are oriented perpendicular to the long axis of the article and thus to the gravitational load imparted by the supported object. In various embodiments, however, the long axes of stripes 20 and 40 can be oriented at any convenient angle (e.g., parallel to, or from 30, 45, 60, or 90 degrees away from parallel to) with respect to the long axis $L_{SR}$ of stretch-releasable article 90. And, as mentioned, the individual stripes do not necessarily have to extend purely in a straight line; that is, they can be at least slightly wavy, bowed, sinusoidal, etc.

As will be appreciated based on later disclosures herein, primary adhesive layer 5 may be advantageously bonded to mounting surfaces of e.g. building components, particularly to certain painted surfaces of such components. Thus, in some embodiments a visible surface 12 of first release liner 10 may comprise an indicia 13 indicating that first release liner 10 is disposed on the major side of double-faced stretch-releasable adhesive tape article 90 that is configured to be bonded to a mounting surface of a building component (upon removal of first release liner 10). Such an arrangement is shown in exemplary embodiment in FIG. 3.

If desired, secondary adhesive layer 115 may have the same (e.g., striped) arrangement and/or composition as primary adhesive layer 5. However, in many embodiments (since adhesive layer 115 may often be bonded e.g. to an item to be mounted on a wall, rather than to a painted surface of the wall itself), secondary adhesive layer 115 can comprise any suitable adhesive, e.g. an organic polymeric adhesive of the general type described later herein.

Individual stripes of adhesives 20 and 40 of adhesive layer 5 may have any desired (lateral) width. In various embodiments, an individual stripe may comprise an average width that is at least about 0.1, 0.2, or 0.4 mm (noting that the width of a stripe may occasionally vary somewhat along the long axis of the stripe). In further embodiments, an individual stripe may comprise an average lateral width that is at most about 2, 1, or about 0.6 mm. Stripes of a particular type (e.g., of adhesive 20 or 40) do not all have to be of the same width; moreover, stripes 20 do not have to be the same width as stripes 40. As discussed herein, the width of some stripes 20 (and 40) may be different on the side of the stripe that faces release liner 10, from the width on the opposite side. For such stripes, the average widths refer to the average of the widths on the two sides of the stripe.

Figure 5:
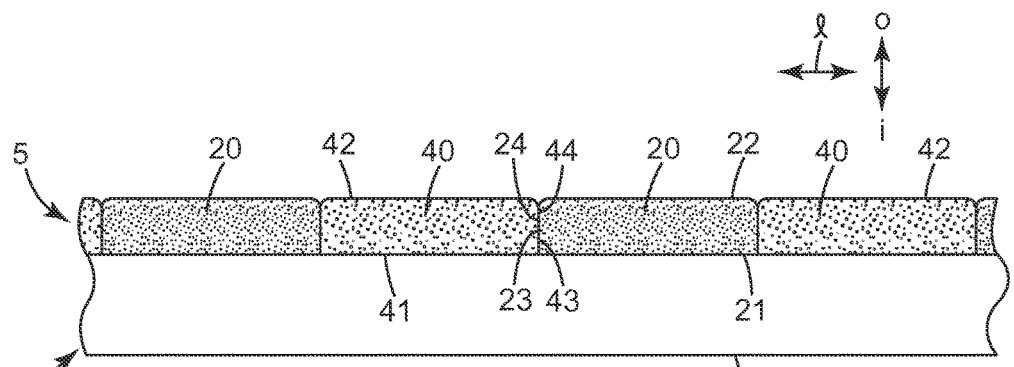
FIG. 5 is a schematic cross sectional slice view of a portion of another exemplary article as disclosed herein.
Figure 6:
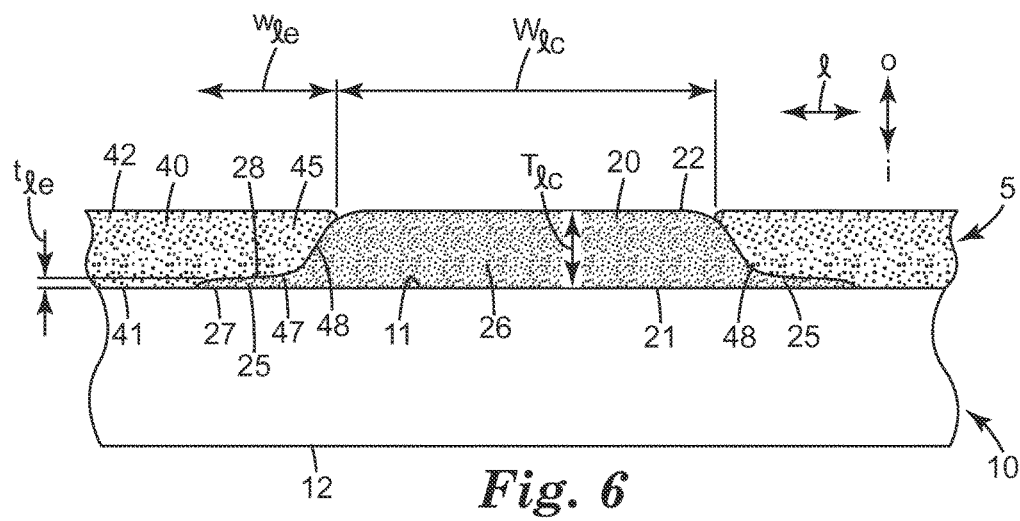
FIG. 6 is a schematic cross sectional slice view of a portion of another exemplary article as disclosed herein.

Individual stripes 20 and 40 may have any suitable average thickness (in the inward-outward direction relative to release liner 10, as designated in FIG. 1). In various embodiments, stripes 20 and/or 40 may comprise an average thickness of at least about 10, 20, 40, or 60 microns. In further embodiments, stripes 20 and/or 40 may comprise an average thickness of at most 140, 100, 80, or 70 microns. In some embodiments, all stripes of a particular type may be similar in thickness and/or stripes 40 may have approximately the same average thickness as that of stripes 20 (as in the general designs illustrated in FIGS. 1, 2, 4 and 5). However, it may not be required that all stripes have identical thickness or even similar thickness, as will be evident from later discussions herein. The thickness of some stripes 20 (and/or 40) may vary across the lateral width of the stripe. For such stripes, the average thickness can be measured at or near the lateral center of the stripe (e.g., thickness $T_{1c}$ as shown in FIG. 6).

Stripes 20 and 40 may be provided at any desired pitch (i.e., the center-to-center distance between adjacent stripes). It may be advantageous that the pitch be relatively small e.g. so that a relatively smooth and continuous removal process (e.g., when peeling a conventional tape, or when stretching a stretch-releasable tape) may be obtained. Thus, in various embodiments, the center-to-center pitch between adjacent stripes may be at most about 4, 2.5, 2, 1.5, or 1 mm. In further embodiments, such a center-to-center pitch may be at least about 0.5, 1, 1.5, or 2 mm. The pitch does not have to be constant, but can be if desired. Individual stripes 20 and/or 40 may often be continuous along their long axis, but can be discontinuous (interrupted) if desired. However, in any case, such stripes will be distinguished (i.e., by way of each stripe being comprised of segments that each comprise a long axis that is coincident with the long axis of the stripe) from e.g. adhesives that are deposited on a surface as an array of dots by way of e.g. gravure coating, screen printing, and the like. In some embodiments, liner-facing major surfaces 21 of stripes 20 may be coplanar with liner-facing major surfaces 41 of stripes 40.

Area Fractions

Figure 4:
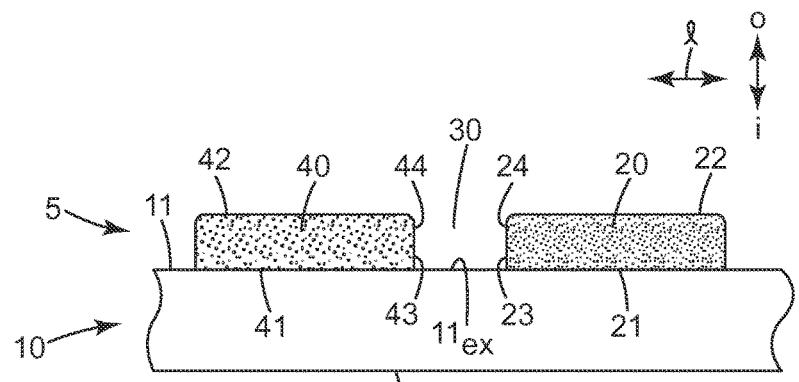
FIG. 4 is a schematic cross sectional slice view of a portion of another exemplary article as disclosed herein.

In some embodiments, at least some of stripes 20 and 40 may be spaced across a lateral extent of release liner 10 so that a gap 30 is present between two adjacent stripes 20 and 40, in which gap 30 an exposed surface $11_{ex}$ of first (fluorosilicone) release surface 11 is present as shown in FIG. 4. It will thus be appreciated that primary adhesive layer 5 is not required to comprise a laterally continuous (uninterrupted) layer of adhesive. That is, adhesive layer 5 can be provided collectively by stripes 20 and 40, regardless of any gaps that might be interspersed between the various stripes. In arrangements of the general type shown in FIG. 4, at least some first adhesive stripes 20 may each comprise a lateral edge 23 comprising a lateral edge minor surface 24. Similarly, at least some second adhesive stripes 40 may each comprise a lateral edge 43 comprising a lateral edge minor surface 44. In such "spaced" arrangements, edges 23 and 43 (specifically, surfaces 24 and 44 thereof) of adjacent stripes 20 and 40 are not in contact with each other.

To aid in characterizing designs e.g. of the general type in which gaps are present between at least some stripes, for each of first and second adhesives 20 and 40 an overall area fraction can be defined that is the fraction (percentage) of the total area of adhesive layer 5 that is collectively occupied by the stripes of that adhesive. A gap area fraction of adhesive layer 5 that is collectively provided by any gaps may be similarly defined. For details of the measurement and calculation of area fractions e.g. by optical methods, see the Test Procedures section of the Examples. Here and elsewhere herein, an area fraction will be with respect to the surface of adhesive layer 5 that is opposite from release liner 10 unless specifically stated otherwise (noting that in some cases, e.g. in the absence of any herein-described silicone surface-enrichment effects, the release-liner-side area fraction of an adhesive will be essentially equal to the opposite-side area fraction of that adhesive, as discussed later herein).

By way of specific illustration, Working Example 1-1 (Table 1) comprised an overall area fraction of first, silicone-based adhesive of approximately 23%, an overall area fraction of second, organic polymeric adhesive of approximately 33%, and a gap area fraction of approximately 44% (with the three parameters adding to approximately 100% of the total area of adhesive layer 5). Thus in various embodiments, first, silicone-based adhesive 20 may provide an overall area fraction of adhesive layer 5 of at least about 20, 25, 30, 35, or 40%. In further embodiments, first, silicone-based adhesive 20 may provide an overall area fraction of adhesive layer 5 of at most about 70, 60, 50, or 40%.

The Working Examples (see e.g. Table 1) demonstrate that in some cases a gap area fraction of up to e.g. 46% or more may be present. That is, in some cases as much as e.g. 46% or more of the total area of adhesive layer 5 may be empty of adhesive (that is, will be occupied by exposed surface $11_{ex}$ of release liner 10), while still providing excellent resistance to e.g. peel forces and shear forces (when adhesive layer 5 is bonded to an item after release liner 10 is separated from layer 5). In fact, excellent performance can be maintained even in an arrangement (discussed above with reference to FIG. 3) in which the individual adhesive stripes of an adhesive layer are oriented with their long axes perpendicular to the shear force (gravitational load) placed on the adhesive layer. This is unexpected in that the presence of such large and/or numerous gaps along the shear path in between the adhesive stripes might be expected to significantly reduce the collective ability of the stripes to withstand high shear forces. Thus, in various embodiments, adhesive layer 5 may comprise a gap area fraction of at least about 10, 20, 30, or 40%. In further embodiments, adhesive layer 5 may comprise a gap area fraction of at most about 60, 50, 45, 40, 35, or 30%. (As discussed below, in some embodiments the gap area fraction may be lower than 10%; in particular embodiments, no gaps may be present at all.)

For each adhesive, an adhesive-only area fraction can also be defined, which parameter denotes the fraction of the total area occupied by the adhesive stripes, that is provided by the stripes of that particular adhesive. The adhesive-only area fractions are thus indicative of the relative areas occupied by the first and second adhesives on an adhesive-only basis, irrespective of any area that is occupied by gaps in which no adhesive is present. For example, the adhesive-only area fraction of the first, silicone-based adhesive of Working Example 1-2 (Table 1) was approximately 38%; the adhesive-only area fraction of the second, organic polymeric adhesive of Working Example 1-2 was approximately 62%.

In some embodiments, at least selected pairs of adjacent stripes of first adhesive 20 and second adhesive 40 may be configured so that a minor surface 24 of a lateral edge 23 of first pressure-sensitive adhesive stripe 20, is in generally lateral contact with a minor surface 44 of a lateral edge 43 of second pressure-sensitive adhesive stripe 40. Such an arrangement is shown in exemplary manner in FIG. 5. It will be understood that by generally lateral contact is meant that the majority of the interface between surfaces 24 and 44 is aligned generally perpendicular to (that is, within plus or minus 20 degrees of perpendicular to) the major plane of release liner 10. Such an arrangement may be distinguished from e.g. arrangements such as those of FIG. 6, which is are discussed later herein. It will be appreciated that in arrangements such as shown in FIG. 5, no gap may be present between a particular first stripe 20 and one or both second stripes 40 that are laterally adjacent to (i.e., that laterally flank) that stripe 20. In specific embodiments, no gaps may be present between any stripes 20 and laterally adjacent stripes 40 (and vice-versa). In such cases, essentially 100% of the total area of adhesive layer 5 will be comprised of adhesive (that is, the above-mentioned gap area fraction will be approximately zero, and the overall area fraction of a given adhesive will typically correspond closely to the adhesive-only area fraction of that adhesive). By way of illustration, Working Example 2-1 (Table 2) comprised an area fraction of silicone-based adhesive of approximately 33%, and an area fraction of organic polymeric adhesive of approximately 67% (with no measurable gap area fraction being evident, and with the adhesive-only area fraction of each adhesive being essentially equal to its overall area fraction). In various embodiments, first, silicone-based adhesive 20 may comprise an adhesive-only area fraction of at least about 30, 35, 40, 45, or 50%. In further embodiments, first, silicone-based adhesive 20 may comprise an adhesive-only area fraction of at most about 70, 65, 60, 55, or 50% (with, in both cases, the balance being supplied by second, organic polymeric adhesive 40).

Stripes with Silicone Surface-Enrichment

In some embodiments, at least selected pairs of adjacent stripes of first adhesive 20 and second adhesive 40 may be configured (as shown in exemplary embodiment in FIG. 6) so that a lateral edge portion 25 of first pressure-sensitive adhesive stripe 20 inwardly underlies a lateral edge portion 45 of second pressure-sensitive adhesive stripe 40. (Many stripes of this general type will comprise two such lateral edge portions 25, as shown e.g. in FIG. 6). As can be appreciated from the exemplary illustration of FIG. 6, by inwardly underlies means that a straight line that is passed in an outward→inward direction through portion 45 of second adhesive stripe 40 will pass through portion 25 of first adhesive stripe 20 before reaching release liner 10. Thus in such arrangements, rather than interface 48 between adjacent edge surfaces of stripes 20 and 40 being substantially perpendicular to the major plane of substrate 80 (as in the design of FIG. 5), interface 48 (between adjacent edge surfaces 28 and 47) may run at an angle that is e.g. far removed from the perpendicular as shown in FIG. 6. Moreover, the angle of interface 48 does not necessarily have to be constant, again as shown in exemplary embodiment in FIG. 6. (In some such embodiments the angle of interface 48 may decrease as it approaches surface 21 of stripe 20, so that portion 25 may e.g. comprise a laterally-elongated flange portion as shown in FIG. 6.)

In such embodiments lateral edge portion 25 of first pressure-sensitive adhesive stripe 20 may thus comprise a first surface 27 that is in contact with release surface 11 of liner 10; and, at least some part of edge portion 25 may further comprise a second, generally oppositely-facing surface 28 that is in contact with a surface 47 of a lateral edge portion 45 of second pressure-sensitive adhesive stripe 40. It will be appreciated from inspection of FIG. 6 that the condition that surface 28 (which contacts second adhesive 40) is "generally oppositely facing" with respect to major surface 27 (which contacts release liner 10) does not require that these two surfaces (of edge portion 25) must face diametrically away from each other, nor does it require that the orientation of the two surfaces remains constant over the lateral extent of lateral edge portion 25 of stripe 20. Rather, it merely implies that in lateral edge portion 45 of second adhesive stripe 40, surface area 47 of inward major surface 41 of second adhesive stripe 40, which area 47 would ordinarily be expected to contact release liner 10, is instead in contact with outward surface 28 of lateral edge portion 25 of first adhesive stripe 20 (at interface 48).

Significant advantages can be imparted by such designs. Specifically, in some particular applications, first, silicone-based adhesive 20 may provide enhanced performance (as discussed in detail later herein). However, such silicone-based adhesives may be e.g. more expensive than the organic polymeric adhesive of second stripes 40. The arrangements disclosed herein allow that in lateral edge portions 25, first adhesive 20 can be preferentially provided (e.g. in a relatively thin surface layer) against the release surface 11 of release liner 10 instead of second adhesive 40 being present in such locations. That is, the area of first surface 21 of first, silicone-based adhesive 20 that is against surface 11 of release liner 10 may be greater than that expected based on the overall amounts of the first and second adhesives in adhesive layer 5. This arrangement will be referred to herein as silicone surface-enrichment (or simply as silicone enrichment).

It will be appreciated that upon removal of release liner 10, surface 21 of silicone-based adhesive 20 that is thus exposed will be in position to be adhesively bonded to e.g. a surface of a building component. The enrichment of silicone-based adhesive 20 at this surface (compared e.g. to the fraction of first silicone-based adhesive 20 at the opposite surface of adhesive layer 5) can thus provide enhanced bonding to certain surfaces while minimizing the amount of silicone-based adhesive 20 that is used in adhesive layer 5 as a whole. Conversely, the oppositely-facing side of adhesive layer 5 may become enriched in the organic polymeric adhesive 40 (although this may not always happen, as discussed later herein). This may be of little or no consequence since this oppositely-facing side of adhesive layer 5 may be e.g. bonded to backing 80, and thus may have no particular need to provide enhanced adhesion to e.g. a painted surface.

In embodiments of this type (e.g. as shown in FIG. 6), at least some of first adhesive stripes 20 may each comprise a laterally-central portion 26 with a second major surface 22 that faces generally opposite first major surface 21 of first adhesive stripe 20, which second major surface 22 of laterally-central portion 26 of first adhesive stripe 20 is not in contact with (e.g., is not covered by) second adhesive stripe 40. In other words, major surface 22 of laterally-central portion 26 may be an exposed surface after the formation of adhesive layer 5, so that exposed surface 22 can be e.g. bonded to tape backing 80. Thus, at least portions of such an adhesive layer 5 may avoid the potential disadvantages of having an internal interfacial boundary that is present between first and second adhesives 20 and 40 and that extends over most or all of the area of adhesive layer 5. Such an arrangement can be differentiated from e.g. conventional multilayer coating of layers of different adhesives.

In at least some embodiments in which silicone-enrichment is present, at least selected stripes 20 will have a defined and identifiable laterally-central portion 26 (as shown in exemplary manner in FIG. 6). Portion 26 may comprise a lateral extent over which the thickness of the stripe may be generally or even substantially constant, which laterally-central portion 26 comprises (and is laterally flanked by) first and second lateral edge portions 25 extending therefrom on the side of stripe 20 that faces liner 10, again as shown in FIG. 6. Arrangements of this general type can be characterized in further detail. Specifically, for a first stripe 20 of this general type, the (lateral) width $w_{1e}$ of lateral edge portion 25 can be compared to the width $W_{1e}$ of laterally central portion 26, as shown in FIG. 6. In various embodiments, such a lateral width $w_{1e}$ of lateral edge portion 25 may be at least 10, 20, 40, or even 60% or more, of the lateral width $W_{1e}$ of laterally central portion 26. In further embodiments, such a lateral width of lateral edge portion 25 may be less than about 70, 50, 30, 20, or 10% of the lateral width of laterally central portion 26. The (total) substrate-side lateral width of each stripe 20 in which surface-enrichment is present, will be given by the sum $W_{1e}+w_{1e}+w_{1e}$. (It is noted however that in some embodiments a stripe of a first adhesive might be surface-enriched only along one lateral edge, and might comprise an adhesive-free gap along its other lateral edge, in which case the substrate-side width of such a stripe would be $W_{1e}+w_{1e}$). The opposite-side lateral thickness will be given by $W_{1e}$. In various embodiments, the substrate-side lateral width of a stripe 20, may be greater than the opposite-side lateral width of that stripe 20, by a factor of at least about 1.2, 1.6, 2.0, or 2.5.

The thickness $t_{1e}$ of a lateral edge portion 25 may be compared to the average thickness $T_{1e}$ of laterally-central portion 26 of first adhesive stripe 20. Although the thickness $t_{1e}$ may vary over the lateral extent of edge portion 25 (as shown in FIG. 6), a local thickness can be measured in any particular part of edge portion 25. Thus, in various embodiments, at least a part of lateral edge portion 25 of adhesive stripe 20 (e.g., toward the laterally-outermost edge of portion 25) may comprise a thickness $t_{1e}$ that is less than about 60, 40, 20, or 10% of the average thickness $T_{1e}$ of the laterally-central portion 26 of first adhesive stripe 20.

Liner-Side & Opposite-Side Area Fractions

Silicone surface-enrichment may be characterized in terms of the area fractions that are provided by each adhesive at each surface of adhesive layer 5. (In cases in which gaps are not present, such area fractions can be equivalently considered to be overall, or adhesive-only, area fractions.) Specifically, for first adhesive 20 a liner-side area fraction can be obtained, and an opposite-side area fraction can be obtained. In designs of the type of FIGS. 1-5 (in which little or no silicone-enrichment is present), the liner-side and opposite-side area fractions for first adhesive 20 will typically be very similar to each other; that is, in such circumstances the two can be considered to be equivalent to each other. However, if silicone enrichment is present (as in designs of the type of FIG. 6) the liner-side area fraction and the opposite-side area fraction provided by first adhesive 20 may differ significantly from each other. (The same holds true for second adhesive 40).

In other words, the fraction that first (silicone-based) adhesive 20 provides of the adhesive materials present at the surface of adhesive layer 5 that is in contact with release liner 10 can be determined. This can be compared to the fraction that first adhesive 20 provides of the adhesive materials present at the opposite surface of adhesive layer 5. When silicone enrichment is present at the liner-side surface of adhesive layer 5, the difference between the liner-side and opposite-side area fractions of first adhesive 20 (and corresponding parameters for second adhesive 40) can characterize the extent of such silicone enrichment. Specifically, the ratio of these two area fractions can be obtained. Thus to summarize with reference to FIG. 6, a measure of silicone enrichment at the surface 21 of adhesive layer 5 that is in contact with release liner 10, can be obtained by ratioing the area fraction that surface 21 occupies (of surfaces 21 and 41 of the first and second adhesives respectively) on the liner side, to the area fraction that surface 22 occupies (of surfaces 22 and 42 of the first and second adhesives respectively) on the opposite side. Such a ratio can provide a quantitative measure of the silicone enrichment at the liner side of adhesive layer 5.

In embodiments of the general type shown e.g. in FIGS. 1-2 and 4-5, e.g. with little or no silicone enrichment being present, such a silicone-enrichment ratio may be about 1 (i.e., a baseline value). However, in embodiments in which silicone enrichment occurs, such a ratio may be e.g. about 1.1, 1.2, 1.4, 1.6, 1.0, or even 2.0. By way of illustration, in the exemplary representation of FIG. 6, the liner-side area fraction provided by first surface 21 of first adhesive 20 appears to be in the range of 70% (assuming that the stripes are present at roughly equal nominal widths). The opposite-side area fraction provided by second surface 22 of first adhesive 20 appears to be in the range of 50%. Thus, the silicone enrichment ratio would be about 70/50, or about 1.4.

In some embodiments, the general arrangement presented in FIG. 6 may be exploited to an extreme. That is, as shown in exemplary manner in FIG. 7, the lateral edge portions 25 and 25' of two first stripes 20 and 20' that laterally flank a second adhesive stripe 40, may extend so far laterally toward each other that they meet and thus completely underlie the second stripe 40. That is, in such cases essentially 100% of the adhesive surface area of adhesive layer 5 that contacts surface 11 of release liner 10, may be supplied by first adhesive 20. Even in arrangements such as this, the potential problem of failure at the interface between surface 28 of first adhesive 20, and surface 47 of second adhesive 40, does not seem to have been encountered (that is, constructions of this type still exhibit acceptable peel and shear strength). While not wishing to be limited by theory or mechanism, it may be that the particular manner in which such arrangements are achieved (which is discussed in detail later herein) may result in stronger and/or longer-lasting interfacial bonding between the surfaces of the two adhesives. And, of course, the presence of laterally-central portions 26 of first adhesive 20, in which first adhesive 20 provides both of the bonding surfaces (e.g. to a wall surface and to tape backing 80) of adhesive layer 5, and extends continuously therebetween (with no interface between first adhesive 20 and second adhesive 40 being present in this area of adhesive layer 5), may also be beneficial.

It is noted that in embodiments in which silicone enrichment occurs to the extent that two lateral edge portions 25 and 25' extend so far laterally toward each other that they meet, there may be no visibly obvious dividing line between the two stripes 20 and 20' from which each edge portion extended. In this special case, items 20 and 20' can still be considered to be individual stripes that are distinguishable from each other, and each can be considered to comprise an elongate length (i.e. in the direction in which each stripe was deposited onto the moving release liner 10) and a width. However, it is further noted that in the case of a conventional, laterally continuous adhesive layer that might be arbitrarily divided into lateral sections each with a width, such arbitrarily selectable sections or widths, that are not distinguishable from each other, cannot be equated with the term "stripes" as used herein. It is thus emphasized that (even in the case of essentially complete silicone enrichment at the surface of release liner 10), the stripe-coating arrangements presented herein are distinguished from those achieved by conventional multilayer coating, e.g. by coating a layer of silicone-based adhesive onto a fluorosilicone release liner and coating a layer of an organic polymeric based adhesive atop the silicone-based adhesive to achieve a multilayer stack. For example, at the very least such conventional multilayer approaches would not be expected to give rise to lateral edge portions 25 and 45 of stripes 20 and 40 with angled interfaces 48 therebetween, and which lateral edge portions 25 of a stripe 20 are readily distinguishable from a laterally-central portion 26 of the stripe, as discussed above.

Figure 8:
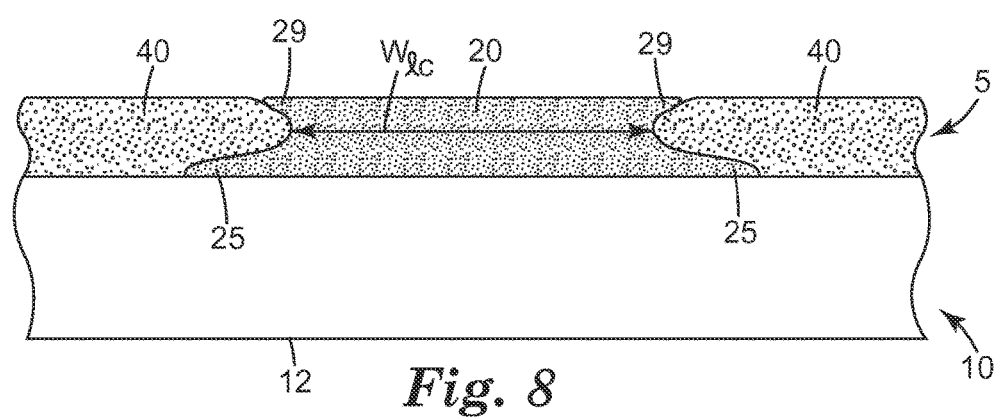
FIG. 8 is a schematic cross sectional slice view of a portion of another exemplary article as disclosed herein.

Although the above-discussed silicone enrichment may occur primarily at the major surface of adhesive layer 5 that is in contact with the fluorosilicone release surface 11 of release liner 10, some silicone surface-enrichment has occasionally been observed at the oppositely-facing surface of adhesive layer 5, as shown in FIG. 8. That is, a stripe of first, silicone-based adhesive 20 may exhibit one or more secondary lateral edge portions 29 on the opposite surface from the above-described lateral edge portions 25. Such arrangements may provide further advantages in allowing the surface area of exposed first adhesive 20 to be maximized on both bonding surfaces of adhesive layer 5, while using a minimal amount of first adhesive 20. In the special case in which some surface enrichment occurs at the opposite surface, the minimum lateral width of stripe 20 (e.g. as designated by the double-headed arrow of FIG. 3) is used as the opposite-side lateral width ($W_{1c}$) for purposes of comparison with the substrate-side lateral width, for calculation of area ratios, etc.)

It is noted that a skilled artisan might expect that the contributions of two different adhesives in an adhesive layer to the overall performance of the adhesive layer would be generally in proportion to the bonding area which each adhesive presents. In contrast, in the present work it has been found that the advantageous effects of the herein-disclosed silicone-based adhesives can be out of proportion to the bonding area fraction that the silicone-based adhesive provides.

Bonding to Architectural Paints at Elevated Humidity/Static Shear

In specific detail, the inventors have found that the herein-disclosed silicone adhesives can advantageously preserve the resistance of adhesive layer 5 to shear forces for long times even when exposed to elevated humidity, and even when the adhesive layer is bonded to certain surfaces that comprise e.g. polar moities (e.g. from hydrophilic additives and the like that may be present at the surface). In particular, certain paints, often referred to in the trade as architectural paints, may comprise e.g. such polar moities (which may be present in e.g. various surfactants, additives, etc, that may help improve the stain-removal properties (washability) of the paint). For the purposes of this discussion, by architectural paint is meant a paint that meets the following criteria: when tested in general accordance with the procedure outlined in ASTM D4828-94, the paint exhibits a stain-removal rating of at least 5 (moderate), 7 (large) or 10 (all of stain removed); and, when a representative organic polymeric pressure-sensitive adhesive layer is bonded to the paint and exposed to an Elevated Humidity/Static Shear Test according to the procedures outlined in the Working Examples herein, the adhesive layer exhibits a time to failure of less than 10000 minutes. (For the purposes of performing such a test, the adhesive described herein as Comparative Example PSA-O-1 may be used as a representative organic polymeric adhesive.) As a standard of reference for this discussion, an exemplary organic polymeric pressure-sensitive adhesive when bonded to an exemplary architectural paint and held in high-humidity conditions may only survive a high-shear load for e.g. about 2500 minutes before failing (as described herein in Comparative Example PSA-O-1-A). An exemplary silicone-based pressure-sensitive adhesive can achieve a threshold level (which has been found to be representative of acceptable performance in the field) of at least about 30000 minutes in these same conditions (as described herein in Comparative Example PSA-S-2-A). Based on their background knowledge in the art, the skilled artisan might expect that an adhesive layer in which the bonding surface comprised a 50/50 ratio of these two adhesives, would exhibit behavior that was proportionally between that of the two individual adhesives. However, as demonstrated in the Working Examples herein, overall bonding-area percentages of silicone adhesive as low as e.g. 23% can still achieve the desired threshold performance level of at least about 30000 minutes in an Elevated Humidity/Static Shear Test. By way of illustration, Working Example 1-1 (Table 1), in which the bonding surface of an adhesive layer 5 that was bonded to an architectural paint comprised approximately 23% by area silicone-based adhesive, approximately 33% by area organic polymeric adhesive, and a gap area fraction of approximately 44%, still met the above-mentioned threshold requirement (that is, it appeared to match the performance of the 100% silicone-based adhesive of Comparative Example PSA-S-2-A in this regard).

Volume Fractions

The above-presented arrangements can provide benefits by allowing the actual bonding surface area provided by a silicone-based adhesive to be greater than that which would be expected based on the volume fraction at which the silicone-based adhesive is present in adhesive layer 5. (By the volume fraction provided by an adhesive (e.g., a first, silicone-based adhesive) is meant the fraction (percentage) of the total volume of adhesive layer 5 (including that occupied by gaps) that is collectively occupied by the stripes of that adhesive.) Instead of, or in addition to, the already-discussed silicone surface-enrichment effects, the volume fraction at which first, silicone-based adhesive 20 is present may be manipulated by arranging for the thickness of the stripes of first adhesive 20 to be different from the thickness of stripes of second adhesive 40. Specifically, in some embodiments, the thickness of the stripes of first, silicone-based adhesive 20 relative to that of the stripes of second adhesive 40, may be advantageously minimized so as to use a lower volume fraction of first adhesive 20 while preserving acceptable properties of adhesive layer 5. By way of illustration, it is evident from Tables 1-4 of the Working Examples that the relative (average) thickness of first adhesive stripes 20 may be lower than the (average) thickness of second adhesive stripes 40 by a factor of e.g. 1.2, 1.5, 2.0, 2.5, 3.0, or even 3.4. Such embodiments can allow the use of a very low volume fraction of first adhesive 20, while still achieving and maintaining an acceptable bond.

By way of illustration, Working Example 2-1 comprised an overall area fraction of first adhesive 20 of approximately 33% (with the 67% balance being supplied by second adhesive 40). However, because the stripes of first adhesive 20 were much thinner than those of second adhesive 40 (approximately 0.8 mils versus 2.7 mils), the volume fraction of first adhesive 20 was only approximately 13% (with the 87% balance being made up by second, organic polymeric adhesive 40). It is thus evident from Working Example 2-1 that in some embodiments, first adhesive 20 can be provided at a volume fraction as low as in the range of e.g. 13% while still preserving acceptable adhesive properties. Thus, in various embodiments, first, silicone-based pressure-sensitive adhesive 20 may be provided at a volume fraction of at least about 12, 13, 15, 20, 25, 30, 35, 40, 50, or 60%. (The balance of adhesive layer may be provided by second adhesive 40, alone or in combination with adhesive-free gaps, as discussed below). In further embodiments, first adhesive 20 may be provided at a volume fraction of at most about 85, 80, 70, 60, 50, 45, 40, 35, 30, or 25% (noting that e.g. Tables 3 and 4 denote arrangements in which the volume fraction of first adhesive 20 is estimated to be as high as about 82%).

Consideration of the effects of adhesive-free gaps can further illustrate the degree to which the volume fraction of first adhesive 20 in adhesive layer 5 may be minimized By way of illustration, for Working Example 1-1, the volume fraction of first adhesive 20 was approximately 16%, the volume fraction of second adhesive 40 was approximately 39%, and the volume fraction of the gaps was approximately 45% (see the Test Procedures for a discussion of how these calculations are performed). Such results reveal the effect of gaps in allowing the volume fraction of first adhesive 20 to be minimized (even though first adhesive 20 might comprise a relatively high volume fraction of the adhesive materials of adhesive layer 5). Accordingly, any of the above-recited volume fractions of first adhesive 20 may be used e.g. in combination with a gap area fraction of from about 0, 10, 20, or 25% to about 60, 50, 40, or 35%.

It is noted that the presence, in adhesive layer 5, of such a large mismatch between the thickness of the stripes of first and second adhesives (e.g., up to a factor of 3.4) might be expected by the skilled artisan to disadvantageously affect the ability of adhesive layer 5 to achieve and maintain a bond. While not wishing to be limited by theory or mechanism, it is believed that any of several factors may enhance the ability of adhesive layer 5 to achieve and maintain an adequate bond even in the case of such a thickness mismatch. One factor may lie in the aspect ratio of the stripe width to the stripe thickness. Setting the aspect ratio in the proper range may allow that a majority of even a "recessed" surface of a thinner stripe can be contacted with the surface to which adhesive layer 5 is desired to be bonded. Thus, in various embodiments, the width/thickness aspect ratio of any of the adhesive stripes disclosed herein may be at least about 5, 20, 20, or 40 to 1. In further embodiments, such an aspect ratio may be at most about 200, 150, 100, 80, or 40 to 1. Another factor that may arise in some embodiments may lie in the bonding of adhesive layer 5 to a relatively thick and conformable backing for example comprising a polymeric foam (to form e.g. a stretch-releasable article). As shown in exemplary illustration in FIG. 9, such a backing 80 might exhibit sufficient ability to conform to the contours of adhesives stripes 20 and 40 of mismatched thicknesses, that surface 81 of backing 80 is able to contact even the recessed surfaces 22 of thinner stripes 20 so as to satisfactorily achieve and maintain a bond. Further details of such backings are discussed later herein. Still another factor may lie in the deposition (e.g., by coating as discussed later herein) of the adhesive stripes onto the surface of release liner 10. This has the advantageous result that even if stripes 20 are thinner than stripes 40, the bonding surfaces 21 of thinner stripes 20 that are to be bonded to e.g. a painted surface (upon separation of release liner 10 from adhesive layer 5) may remain at least generally flush (even with) bonding surfaces 41 of thicker stripes 40 that are likewise to be bonded to the painted surface. That is, any effect of the mismatched stripe thicknesses may be mostly evident on the opposite side of adhesive layer 5 (where they can be compensated for e.g. by the use of a relatively thick and conformable backing 80 if need be), with little effect of the thickness mismatch being evident at the surface of adhesive layer 5 that is to be bonded e.g. to a painted surface. Thus, certain of the features disclosed herein, alone or in combination, may be particularly advantageous in some circumstances.

In some circumstances, of course, it may be desired that the average thickness of first adhesive stripes 20 be similar to the average thickness of second adhesive stripes 40. Thus in some embodiments, the average thickness of first adhesive stripes 20 is within plus or minus 40, 20, 10, or 5% of the average thickness of second adhesive stripes 40. In still other circumstances, it may be desired that the thickness of first adhesive stripes 20 may be greater than that of second adhesive stripes 40. In still other embodiments, at least some stripes (of adhesive 20 and/or 40) may be thinner than other stripes of the same composition, in order to provide e.g. air bleed capability.

In broad summary, by any of several arrangements disclosed herein, used individually or in any combination, a significant volume fraction and/or area fraction of a silicone-based adhesive may be replaced by e.g. a lower-performing organic polymeric adhesive, and/or may be replaced by gaps in which no adhesive is present at all, while still meeting a satisfactory performance threshold. That is, the inventors have demonstrated that the herein-disclosed arrangements can provide performance that is out of proportion to the level at which the silicone-based adhesive is present in adhesive layer 5. These discoveries allow a significant volume fraction of a silicone-based adhesive to be omitted, while significantly, or even substantially, preserving the properties that would be achieved with a purely silicone-based adhesive layer. It will be appreciated that such results may be obtained e.g. by replacing a significant volume fraction of the silicone-based adhesive with an organic polymeric adhesive (as in e.g. Working Example 2-1); or, by replacing a significant volume fraction of the silicone-based adhesive with a combination of an organic polymeric adhesive and adhesive-free gaps (as in e.g. Working Example 1-1). Thus by either approach, the volume fraction of a silicone-based adhesive in adhesive layer 5 can be reduced even to e.g. 10-20% if desired, while preserving acceptable properties.

It will be further appreciated that the herein-described silicone surface-enrichment effects can augment and/or amplify such effects. For example, Working Example 3-1 disclosed an arrangement in which stripes of silicone-based adhesive 20 exhibited an opposite-side area fraction of approximately 33% (with stripes of organic polymeric adhesive 40 making up the 67% balance, no gaps being present between stripes). However, due to surface-enrichment effects, the liner-side area fraction of silicone-based adhesive was approximately 69% (versus the 33% value on the opposite side). Such arrangements, which can advantageously increase the amount of silicone-based adhesive present at the interface with e.g. a painted surface, may likewise prove beneficial, as discussed herein.

Pressure-Sensitive Adhesives

First adhesive 20 and second adhesive 40 are both pressure-sensitive adhesives. Pressure-sensitive adhesives are normally tacky at room temperature and can be adhered to a surface by application of, at most, light finger pressure and thus may be distinguished from other types of adhesives that are not pressure-sensitive. A general description of pressure-sensitive adhesives may be found in the Encyclopedia of Polymer Science and Engineering, Vol. 13, Wiley-Interscience Publishers (New York, 1988). Additional description of pressure-sensitive adhesives may be found in the Encyclopedia of Polymer Science and Technology, Vol. 1, Interscience Publishers (New York, 1964). In at least some embodiments, a pressure-sensitive adhesive may meet the Dahlquist criterion described in Handbook of Pressure-Sensitive Adhesive Technology, D. Satas, 2nd ed., page 172 (1989). This criterion defines a pressure-sensitive adhesive as one having a one-second creep compliance of greater than $1 \times 10^{-6}$ cm$^2$/dyne at its use temperature (for example, at temperatures in a range of from 15° C. to 35° C.). Given these discussions, a pressure-sensitive adhesive as disclosed herein will be distinguished from e.g. tie layers, primer layers, and the like (which layers, even if when applied to a mounting surface may enhance the ability of a pressure-sensitive adhesive to bond to the mounting surface, do not exhibit any pressure-sensitive properties of their own). In some embodiments, one or both of first and second adhesives 20 and 40 may be a repositionable adhesive. In alternative embodiments, neither of first and second adhesives 20 and 40 are repositionable.

Silicone-Based Pressure-Sensitive Adhesives

First pressure-sensitive adhesive 20 is a silicone-based pressure-sensitive adhesive that includes at least one silicone elastomeric polymer and that may contain other optional components such as tackifying resins. The silicone elastomeric polymer may be a silicone block copolymer elastomer comprising hard segments that each comprise at least one polar moiety. By a polar moiety is meant a urea linkage, an oxamide linkage, an amide linkage, a urethane linkage, or a urethane-urea linkage. Thus, suitable silicone block copolymer elastomers include for example, urea-based silicone copolymers, oxamide-based silicone copolymers, amide-based silicone copolymers, urethane-based silicone copolymers, and mixtures thereof.

The term "silicone-based" as used herein refers to macromolecules (e.g., polymer or copolymer) that contain silicone units. (Similarly, the term silicone adhesive, which may be used occasionally herein as shorthand for a silicone-based adhesive, denotes a pressure-sensitive adhesive based on an elastomer that comprises silicone units). The terms silicone or siloxane are used interchangeably and refer to units with a siloxane (—Si($R^1$)$_2$O—) repeating units where $R^1$ is defined below. In many embodiments, $R^1$ is an alkyl. The term "urea-based" as used herein refers to macromolecules that are segmented copolymers which contain at least one urea linkage. The term "amide-based" as used herein refers to macromolecules that are segmented copolymers which contain at least one amide linkage. The term "urethane-based" as used herein refers to macromolecules that are segmented copolymers which contain at least one urethane linkage.

Silicone Polyureas

One example of a useful class of silicone elastomeric block copolymers is urea-based silicone polymers such as silicone polyurea block copolymers. Silicone polyurea block copolymers may be e.g. the reaction product of a polydiorganosiloxane diamine (also referred to as a silicone diamine), a polyisocyanate, and optionally an organic polyamine. As used herein, the term "polyisocyanate" refers to a compound having more than one isocyanate group. As used herein, the term "polyamine" refers to a compound having more than one amino group.

Suitable exemplary silicone polyurea block copolymers are represented by the repeating unit of Formula (I):

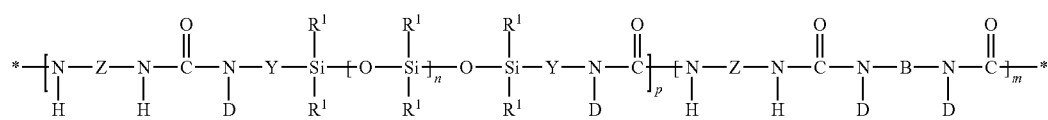

In Formula (I), each $R^1$ is independently an alkyl, haloalkyl, alkenyl, aralkyl, aryl, or aryl substituted with an alkyl, alkoxy, or halo. Suitable alkyl groups for $R^1$ in Formula (III) typically have 1 to 10, 1 to 6, or 1 to 4 carbon atoms. In many embodiments, at least 50 percent of the $R^1$ groups may be methyl. Each group Z in Formula (I) is independently an arylene, aralkylene, or alkylene. Exemplary arylenes have 6 to 20 carbon atoms and exemplary aralkylenes have 7 to 20 carbon atoms. The arylenes and aralkylenes can be e.g. unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). The alkylenes can be e.g. linear branch, cyclic, or combinations thereof and can have 1 to 20 carbon atoms. Each Y in Formula (I) is independently an alkylene having 1 to 10 carbon atoms, an aralkylene having 7 to 20 carbon atoms, or an arylene having 6 to 20 carbon atoms. Each D is selected from hydrogen, an alkyl having 1 to 10 carbon atoms, an aryl having 6 to 12 carbon atoms, or a radical that completes a ring structure including B or Y to form a heterocycle. Each D is often hydrogen or an alkyl group. Group B may be selected from an alkylene, aralkylene, arylene such as phenylene, or heteroalkylene. Examples of heteroalkylenes include polyethylene oxide, polypropylene oxide, polytetramethylene oxide, and copolymers and mixtures thereof. The variable m is a number that may be 0 to about 1000; p is a number that is at least 1; and n is a number that may be in the range of 0 to 1500.

As mentioned, a polydiorganosiloxane diamine can be reacted with a polyisocyanate to form the silicone polyurea block copolymers. Any suitable polyisocyanate that can react with a suitable polydiorganosiloxane diamine can be used. The polyisocyanate may often be e.g. a diisocyanate or triisocyanate. Examples of suitable polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof. Particular examples of useful silicone diamines that can be used in the preparation of silicone polyurea block copolymers include polydiorganosiloxane diamines represented by Formula (II)

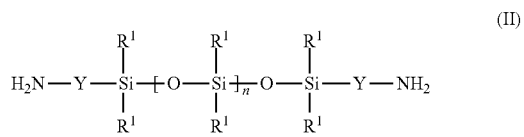

In Formula (II), each $R^1$ is independently an alkyl, haloalkyl, aralkyl, alkenyl, aryl, or aryl substituted with an alkyl, alkoxy, or halo as defined above for Formula (I). Each Y is independently an alkylene, arylene, or aralkylene as defined above for Formula (I). The variable n is an integer of 0 to 1500. The polydiorganosiloxane diamine of Formula (II) can be prepared by any known method and can have any suitable molecular weight, such as a weight average molecular weight in the range of 700 to 150,000 g/mole.

Silicone-based pressure-sensitive adhesives based on silicone-polyurea block copolymers, and the preparation of such block copolymers and adhesives, are described in further detail in U.S. Patent Application Publication No. 2011/0126968 (Determan) and in U.S. Pat. No. 6,569,521

(Sheridan), which are incorporated by reference herein in their entirety. Useful silicone polyurea block copolymers are also described in, e.g. U.S. Pat. No. 5,512,650 (Leir), U.S. Pat. No. 5,214,119 (Leir), U.S. Pat. No. 5,461,134 (Leir), U.S. Pat. No. 6,407,195 (Sherman), U.S. Pat. No. 6,441,118 (Sherman), U.S. Pat. No. 6,846,893 (Sherman), and U.S. Pat. No. 7,153,924 (Kuepfer).

Silicone Polyoxamides

Another useful class of silicone elastomeric block copolymers is oxamide-based polymers such as polydiorganosiloxane polyoxamide block copolymers. A polydiorganosiloxane polyoxamide block copolymer may contain at least two repeat units of Formula (III).

be methyl. The remaining $R^1$ groups can be selected from an alkyl having at least two carbon atoms, haloalkyl, aralkyl, alkenyl, aryl, or aryl substituted with an alkyl, alkoxy, or halo. In many embodiments, all of the $R^1$ groups are an alkyl.

Each Y in Formula (III) is independently an alkylene, arylene, aralkylene, or combinations thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms.

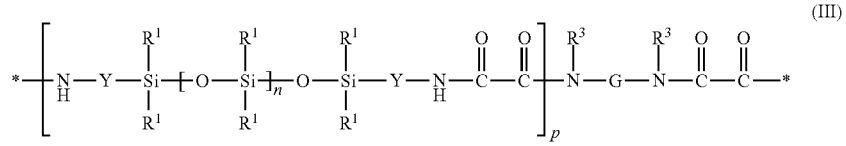

(III)

In Formula (III), each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 40 to 1500 and the subscript p is an integer of 1 to 10. Group G is a divalent group that is the residue unit that is equal to a diamine of formula $R^3HN$-G-$NHR^3$ minus the two —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each asterisk (*) indicates a site of attachment of the repeat unit to another group in the copolymer such as, for example, another repeat unit of Formula (III).

Suitable alkyl groups for $R^1$ in Formula (III) typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

Often, at least 50 percent of the $R^1$ groups are usually methyl. For example, at least 60 percent, at least 70 percent, at least 80 percent, at least 90 percent, at least 95 percent, at least 98 percent, or at least 99 percent of the $R^1$ groups can In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula (III) is independently an integer of 40 to 1500. For example, subscript n can be an integer up to 1000, up to 500, up to 400, up to 300, up to 200, up to 100, up to 80, or up to 60. The value of n is often at least 40, at least 45, at least 50, or at least 55. For example, subscript n can be in the range of 40 to 1000, 40 to 500, 50 to 500, 50 to 400, 50 to 300, 50 to 200, 50 to 100, 50 to 80, or 50 to 60.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula (III) is a residual unit that is equal to a diamine compound of formula $R^3HN$-G-$NHR^3$ minus the two amino groups (i.e., —$NHR^3$ groups). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine). The diamine can have primary or secondary amino groups. In most embodiments, $R^3$ is hydrogen or an alkyl. In many embodiments, both of the amino groups of the diamine are primary amino groups (i.e., both $R^3$ groups are hydrogen) and the diamine is of formula $H_2N$-G-$NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula (II), which are described above, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Silicone-based pressure-sensitive adhesives based on polydiorganosiloxane polyoxamide block copolymers, and the preparation of such block copolymers and adhesives, are described in further detail in U.S. Patent Application Publication No. 2009/0229732 (Determan), 2011/0126968 (Determan), and 2012/0271025 (Hayes), which are incorporated by reference herein in their entirety.

Amide-Based Silicone Polymers

Another useful class of silicone elastomeric block polymers is amide-based silicone copolymers. Such polymers are similar to the urea-based polymers, containing amide linkages (—N(D)-C(O)—) instead of urea linkages (—N(D)-C(O)—N(D)-), where C(O) represents a carbonyl group and D is the same as defined above for Formula (I). The group D is often hydrogen or alkyl.

The amide-based copolymers may be prepared in a variety of different ways. Starting from the polydiorganosiloxane diamine described above in Formula (II), the amide-based copolymer can be prepared by reaction with a poly-carboxylic acid or a poly-carboxylic acid derivative such as, for example di-esters. In some embodiments, an amide-based silicone elastomer is prepared by the reaction of a polydiorganosiloxane diamine and di-methyl salicylate of adipic acid.

An alternative reaction pathway to amide-based silicone elastomers utilizes a silicone di-carboxylic acid derivative such as a carboxylic acid ester. Silicone carboxylic acid esters can be prepared through the hydrosilation reaction of a silicone hydride (i.e. a silicone terminated with a silicon-hydride (Si—H) bonds) and an ethylenically unsaturated ester. For example a silicone di-hydride can be reacted with an ethylenically unsaturated ester such as, for example, $CH_2=CH-(CH_2)_v-C(O)-OR$, where C(O) represents a carbonyl group and v is an integer up to 15, and R is an alkyl, aryl or substituted aryl group, to yield a silicone chain capped with —Si—$(CH_2)_{v+2}$—C(O)—OR. The —C(O)—OR group is a carboxylic acid derivative which can be reacted with a silicone diamine, a polyamine or a combination thereof. Suitable silicone diamines and polyamines have been discussed above and include aliphatic, aromatic or oligomeric diamines (such as ethylene diamine, phenylene diamine, xylylene diamine, polyoxalkylene diamines, etc).

Urethane-Based Silicone Polymers

Another useful class of silicone elastomeric block copolymers is urethane-based silicone polymers such as silicone polyurea-urethane block copolymers. Silicone polyurea-urethane block copolymers include the reaction product of a polydiorganosiloxane diamine (also referred to as silicone diamine), a diisocyanate, and an organic polyol. Such materials are structurally very similar to the structure of Formula (I) except that the —N(D)-B—N(D)- links are replaced by —O—B—O— links. Examples of such polymers are described e.g. in U.S. Pat. No. 5,214,119 (Leir). These urethane-based silicone polymers may be prepared in the same manner as urea-based silicone polymers except that an organic polyol may be substituted for an organic polyamine.

It will be appreciated that, as mentioned earlier, all of the disclosed silicone block copolymers include at least one polar moiety (e.g., a urea linkage, an oxamide linkage, an amide linkage, a urethane linkage, or a urethane-urea linkage) in a repeat unit of the polymer chain (specifically, in a unit of the polymer chain that forms so-called hard segments of the block copolymer).

Tackifying Resins

Silicone-based pressure-sensitive adhesive compositions (whether relying e.g. on a silicone-polyurea block copolymer, a silicone-polyoxamide block copolymer, or any of the other block copolymers disclosed above) may often include an MQ tackifying resin in addition to the silicone elastomeric block copolymer. In various embodiments, the silicone block copolymer may be present in the silicone-based pressure-sensitive adhesive composition (dry basis, excluding solvent) in an amount of from about 30 percent by weight to about 90 percent by weight, 30 percent by weight to 85 percent by weight, 30 percent by weight to 70 percent by weight, or even 45 percent by weight to 55 percent by weight. The MQ tackifying resin, if present, is typically present in an amount of at least 10 percent by weight. In some embodiments, the MQ tackifying resin is present in the silicone-based pressure-sensitive adhesive composition in an amount of from about 15 percent by weight to about 70 percent by weight, from about 30 percent by weight to about 70 percent by weight, or from about 40 percent by weight to about 60 percent by weight, or even 45 percent by weight to 55 percent by weight.

MQ tackifying resins often have a number average molecular weight of about 100 to about 50,000, or about 500 to about 20,000 and generally have methyl substituents. The MQ silicone resin may be a non-functional resin, a functional resin, or may comprise a mixture of both. Functional MQ resins may comprise one or more functionalities including, for example, silicon-bonded hydrogen, silicon-bonded alkenyl, and silanol.

The term MQ resin is used broadly herein to include e.g. so-called MQ silicone resins, MQD silicone resins, and MQT silicone resins. MQ silicone resins are copolymeric silicone resins having $R'_3SiO_{1/2}$ units (M units) and $SiO_{4/2}$ units (Q units). MQD silicone resins are terpolymers having $R'_3SiO_{1/2}$ units (M units), $SiO_{4/2}$ units (Q units), and $R'_2SiO_{2/2}$ units (D units) as described, e.g., in U.S. Pat. No. 5,110,890 (Butler). MQT silicone resins are terpolymers having $R_3SiO_{1/2}$ units (M units), $SiO_{4/2}$ units (Q units), and $RSiO_{3/2}$ units (T units) (MQT resins). Commercially available MQ resins include SR-545 MQ resin in toluene available from General Electric Co., Silicone Resins Division (Waterford, N.Y.), MQOH resins which are MQ silicone resins in toluene available from PCR, Inc. (Gainesville, Fla.).

Silicone-based adhesives, of any of the above-discussed types and variations, may be provided in any suitable form to be formed into stripes 20. For example, such an adhesive may be provided in the form of a precursor liquid that is a flowable liquid that can be deposited onto release liner 10 to form stripes of the precursor liquid, which precursor can then be transformed into the silicone-based adhesive in its final form. Thus, a precursor flowable liquid might be e.g. a 100% solids mixture suitable for e.g. hot melt coating, or a water-borne emulsion (e.g. latex), or a solution in one or more suitable solvents, as discussed later herein. It is moreover noted that not all of stripes 20 need necessarily be of the exact same composition, although this may be conveniently done if desired.

Organic Polymeric Pressure-Sensitive Adhesives

Second pressure-sensitive adhesive 40 is an organic polymeric pressure-sensitive adhesive that by definition includes less than 10 weight percent of a silicone-based pressure-sensitive adhesive (dry weight basis). In various embodiments, adhesive 40 may comprise less than 4, 2 or 1% of a silicone-based adhesive. In many embodiments, adhesive 40 will contain substantially no (i.e., less than 0.2 weight percent) of a silicone-based pressure-sensitive adhesive. It will however be appreciated that in some circumstances adhesive 40 may comprise some small amount (e.g., less than 2.0, 1.0, 0.4, 0.2, 0.1, or 0.05 weight percent) of silicone-containing additive (e.g., emulsifier, plasticizer, stabilizer, wetting agent, etc.). Such circumstances, in which one or more silicone-containing additive(s) is/are present for some purpose other than imparting pressure-sensitive properties to adhesive 40, cannot cause adhesive 40 to be considered to be a silicone-based adhesive.

By organic polymeric pressure-sensitive adhesive is meant that adhesive 40 is based on at least one organic polymeric elastomer (optionally in combination with other components such as one or more tackifying resins). It will be appreciated that organic polymeric adhesive 40 does not have to be based on an organic polymeric elastomer that is purely hydrocarbon (although this may be done if desired). Rather, the presence of heteroatoms (such as O, N, Cl, and so on) is permitted (whether in the backbone of the elastomer chain and/or in a sidechain thereof), as long as the presence of the specific heteroatom Si is minimized according to the criteria outlined above.

General categories of exemplary materials which may be suitable for use in second pressure-sensitive adhesive 40 include e.g. elastomeric polymers based on natural rubber; synthetic rubber (e.g., butyl rubber, nitrile rubber, polysulfide rubber); block copolymers; the reaction product of acrylate and/or methacrylate materials; and so on. (As used herein, terms such as (meth)acrylate, (meth(acrylic), and the like, refer to both acrylic/acrylate, and methacrylic/methacrylate, monomer, oligomers, and polymers derived therefrom). Specific polymers and/or copolymers and/or monomer units suitable for inclusion in such an elastomeric polymer of second adhesive 40 may include, but are not limited to: polyvinyl ethers, polyisoprenes, butyl rubbers, polyisobutylenes, polychloroprenes, butadiene-acrylonitrile polymers, styrene-isoprene, styrene-butylene, and styrene-isoprene-styrene block copolymers, ethylene-propylene-diene polymers, styrene-butadiene polymers, styrene polymers, poly-alpha-olefins, amorphous polyolefins, ethylene vinyl acetates, polyurethanes, silicone-urea polymers, polyvinylpyrrolidones, and any combinations (blends, copolymers, etc.) thereof. Examples of suitable (meth)acrylic materials include polymers of alkyl acrylate or methacrylate monomers such as e.g. methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, octadecyl acrylate, octadecyl methacrylate, acrylic acid, methacrylic acid, acrylonitrile, and combinations thereof. Examples of suitable commercially available block copolymers include those available under the trade designation KRATON from Kraton Polymers, Houston, Tex. Any of these or other suitable materials may be used in any desired combination. A general description of some useful organic polymeric pressure-sensitive adhesives may be found in the Encyclopedia of Polymer Science and Engineering, Vol. 13, Wiley-Interscience Publishers (New York, 1988). Additional descriptions of some useful organic polymeric pressure-sensitive adhesives may be found in the Encyclopedia of Polymer Science and Technology, Vol. 1, Interscience Publishers (New York, 1964).

If desired, a tackifying resin may be included in second adhesive 40. (Those of ordinary skill will appreciate that some elastomers may be self-tacky and thus may require little or no added tackifying resin.) Any suitable tackifying resin or combination thereof may be used. Suitable tackifying resins may include e.g. wood rosins and hydrogenated derivatives thereof, tall oil rosins, terpene resins, phenolic resins, polyaromatics, petroleum-based resins, (e.g. aliphatic C5 olefin-derived resins) and so on. Additionally, pressure-sensitive adhesive 40 can contain additives such as plasticizers, fillers, antioxidants, stabilizers, pigments, and the like.

It may be convenient (e.g., for masking and/or stretch-release uses), that the components of pressure-sensitive adhesive 40 be chosen so as to provide good adhesion to a surface, while also being removable under moderate force without leaving a residue, e.g. a visible residue. In certain embodiments, pressure-sensitive adhesive 40 may be natural-rubber-based, meaning that a natural rubber elastomer or elastomers make up at least about 70 wt. % of the elastomeric components of the adhesive (not including any filler, tackifying resin, etc.). In some embodiments, the organic polymeric elastomer may be a hydrocarbon block copolymer elastomer (e.g., of the general type available under the trade designation KRATON from Kraton Polymers, Houston, Tex.). In specific embodiments, the block copolymer elastomer may be e.g. a styrene-butadiene-styrene (SBS) or a styrene-isoprene-styrene (SIS) block copolymer, a blend of the two, blend of either of both of these with a natural rubber elastomer, and so on (along with e.g. at least one tackifying resin).

Organic polymeric adhesives, of any of the above-discussed types and variations, may be provided in any suitable form to be formed into stripes 40. For example, such an adhesive may be provided in the form of a precursor liquid that is a flowable liquid that can be deposited onto release liner 10 to form stripes of the precursor liquid, which precursor can then be transformed into the organic polymeric adhesive in its final form. Thus, a precursor flowable liquid might be e.g. a 100% solids mixture suitable for e.g. hot melt coating, or a water-borne emulsion (e.g. latex), or a solution in one or more suitable solvents, as discussed later herein. It is moreover noted that not all of stripes 40 need necessarily be of the exact same composition, although this may be conveniently done if desired.

Release Liners

Release liner 10 comprises a release surface on first major surface 11, which release surface is suitable for releasing of a silicone-based pressure-sensitive adhesive therefrom. Release liner 10 may optionally comprise a release surface, e.g. a release surface which is likewise suitable for releasing of a silicone-based pressure-sensitive adhesive therefrom, on second major surface 12. In particular embodiments, the release surface on second major surface 12 may comprise the same, or different, release properties from those of first major surface 11 (in the latter case, liner 10 will thus be a so-called differential-release liner, as will be well understood by the ordinary artisan).

Release surface 11 (and release surface 12, if present) can be provided by any suitable material. Examples of potentially suitable materials includes, but is not limited to, fluorinated materials such as e.g. fluorochemicals, fluorocarbons, fluorosilicones, perfluoropolyethers, perfluorinated polyurethanes, and combinations thereof. In particular embodiments, the fluorinated release surface is provided by a fluorosilicone polymer. Particularly useful fluorosilicone release coatings may include the reaction product of a fluorosilicone polymer, an organohydrogenpolysiloxane crosslinking agent and a platinum-containing catalyst as described, e.g., in U.S. Pat. No. 5,082,706 (Tangney). Other useful fluorine containing organosilicone release coating compositions include, e.g., release coating compositions derived from organopolysiloxanes having fluorine containing organic groups and alkenyl groups, an organohydrogensiloxane crosslinking agent and a platinum-containing catalyst, and release coating compositions derived from organopolysiloxanes having fluorine containing organic groups and silicon-bonded hydrogen groups, an alkenyl functional organopolysiloxane and a platinum-containing catalyst, examples of which are described in U.S. Pat. No. 5,578,381 (Hamada). A number of useful commercially available fluorosilicone polymers are available from Dow Corning Corp. (Midland, Mich.) under the SYL-OFF and the SYL-OFF ADVANTAGE series of trade designations including, e.g., SYL-OFF Q2-7786 and SYL-OFF Q2-7785. Fluorosilicone release coatings are described in further detail in U.S. Pat. No. 8,334,037 (Sheridan), which is incorporated by reference herein in its entirety.

Release liner 10 can be of a variety of forms including, e.g., sheet, web, tape, and film. Examples of suitable materials include, e.g., paper (e.g., kraft paper), polymer films (e.g., polyethylene, polypropylene and polyester), composite liners, and combinations thereof. One example of a useful release liner is a fluoroalkyl silicone polycoated paper. Release liners can optionally include a variety of markings and indicia including, e.g., lines, art work, brand indicia, and other information. Adhesive layer 5 can be provided across substantially the entirety of the width of release liner 10; or, a border may be provided along one or both edges of release liner 10 in which adhesive layer 5 is not present, if desired.

Substrates

Substrate 80 can be any suitable substrate to which it is desired to bond adhesive layer 5. As such, substrate 80 can be any backing (i.e., tape backing) suitable for making any suitable kind of tape (masking tape, sealing tape, strapping tape, filament tape, packaging tape, duct tape, electrical tape, medical/surgical tape, and so on). Backing 80 can take any suitable form including, e.g. polymer films, paper, cardboard, stock card, woven and nonwoven webs, fiber reinforced films, foams, composite film-foams, and combinations thereof. Backing 80 may be comprised of any suitable material including e.g. fibers, cellulose, cellophane, wood, foam, and synthetic polymeric materials including, e.g., polyolefins (e.g., polyethylene, polypropylene, and copolymers and blends thereof); vinyl copolymers (e.g., polyvinyl chlorides, polyvinyl acetates); olefinic copolymers (e.g., ethylene/methacrylate copolymers, ethylene/vinyl acetate copolymers, acrylonitrile-butadiene-styrene copolymers, and so on); acrylic polymers and copolymers; and polyurethanes. Blends of any of these may be used. In particular embodiments, oriented (e.g., uniaxially or biaxially oriented) materials such as e.g. biaxially-oriented polypropylene may be used.

In some embodiments, article 90 may be a stretch-releasable article. In such embodiments, backing 80 may be a highly extensible backing to allow the stretch-releasing properties of the article to be utilized. The term "highly extensible" as used herein means that when backing 80 is stretched along its long axis, an elongation of at least about 150% is achieved without rupture or breakage of backing 80. In such embodiments, backing 80 may be capable of achieving an elongation of e.g. about 350, 550, or 750%.

Suitable highly extensible backings may include e.g. a single layer of foam, multiple layers of foam, a single layer of film, multiple layers of film and combinations thereof. Such materials may be selected to optimize properties such as conformability and resiliency, which are useful when the article is to be adhered to surfaces having surface irregularities, e.g., painted drywall. Such a foam or film layer may be prepared from a variety of thermoplastic polymers including, e.g., polyolefins, vinyl polymers and/or copolymers olefinic copolymers, acrylic polymers and copolymers; polyurethanes; and so on. Backings for stretch-release articles are described in further detail in U.S. Pat. No. 8,344,037 (Sheridan). Backing 80 may comprise any suitable thickness including, e.g., from about 20 microns to about 1 mm. In the particular case in which backing 80 is a highly extensible foam e.g. for a stretch-release article, backing 80 may suitably be thicker (e.g., 0.5 mm or so) than the case in which backing 80 is e.g. biaxially oriented polypropylene e.g. for sealing tape applications. To improve the adhesion of layer 5 to backing 80, a major surface of backing 80 can be pretreated prior to disposing adhesive layer 5 on that surface of backing 80. Examples of suitable treatments include corona discharge, plasma discharge, flame treatment, electron beam irradiation, ultraviolet radiation, acid etching, chemical priming and combinations thereof.

Figure 9:
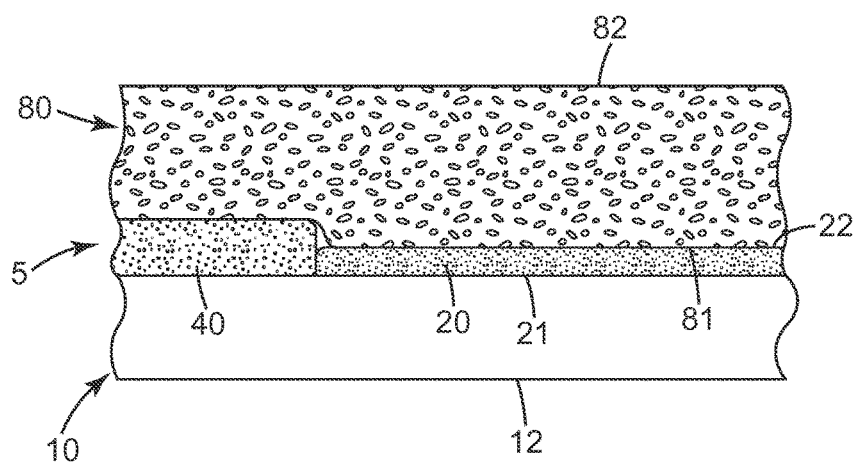
FIG. 9 is a schematic cross sectional slice view of a portion of another exemplary article as disclosed herein.

As mentioned, in some embodiments it may be particularly advantageous that backing 80 comprise a relatively thick and conformable polymeric foam. In particular, such a polymeric foam may comprise sufficient thickness and conformability so as to be able to locally conform to adhesive stripes that may differ in thickness by up to e.g. 20, 40, 60, or 80 microns or more and that may comprise widths of from e.g. about 0.5 to about 4 mm. (A construction in which an adhesive layer 5 comprising relatively thin first adhesive stripes 20 and relatively thick second adhesive stripes 40 is laminated to a relatively thick and conformable polymeric foam substrate 80 is shown in exemplary embodiment in FIG. 9.) In particular embodiments, such a substrate 80 may be sufficiently thick and locally conformable that a first surface 81 of the substrate can satisfactorily conform to stripes of mismatched thicknesses, while a second, oppositely-facing surface 82 of the substrate may remain substantially planar (as illustrated in FIG. 9). In various embodiments, backing 80 may comprise a polymeric foam with a thickness of at least about 0.2, 0.4, 0.8, or 1.2 mm. In further embodiments, such a polymeric foam may comprise a thickness of at most about 8, 4, or 2 mm. In various embodiments, such a polymeric foam may comprise a density of at least about 1, 2, 4 or 6 pounds per cubic foot. In further embodiments, such a polymeric foam may comprise a density of at most about 30, 20 or 10 pounds per cubic foot. If a polymer film is present (e.g. laminated) on the surface of the foam backing to which adhesive layer 5 is to be bonded, such a film may advantageously be thin and conformable to allow the multilayer backing to conform to the stripes.

Although in many situations it may be convenient to use a backing 80 as described herein, in some embodiments adhesive layer 5 may be used as a stretch-release article, without being laminated to e.g. a highly extensible backing. In such cases, adhesive layer 5 may be e.g. thick enough to handle and to provide other useful properties. Thus, in such embodiments adhesive layer 5 may comprise an average thickness of from at least about 5, 10, 15 or 20 mils, to about 100, 80, 60, or 40 mils. In such embodiments, adhesive layer 5 should of course comprise sufficient mechanical integrity to be handleable. Thus, in at least some such embodiments the stripes 20 and 40 may contact each other rather than having gaps in between; and, they should comprise sufficient bonding of the adjacent stripes to each other to provide adhesive layer 5 as a whole with sufficient mechanical integrity.

Methods of Making

Stripes of first adhesive 20 and second adhesive 40 may be deposited on major surface 11 of release liner 10 e.g. by any method that allows the acceptable formation of stripes as disclosed herein. That is, a precursor to first adhesive 20, and a precursor to second adhesive 40, may each be deposited onto release liner 10 as a flowable liquid in any suitable form. For example, such a flowable liquid might be a 100% solids composition (e.g. a hot-melt coating composition) that is deposited followed e.g. by the reaction of functional groups (e.g., crosslinking, polymerization, oligomerization, etc.) to impart the desired adhesive properties to the final product. Or, such a flowable liquid might be a water-borne coating (e.g., a latex or emulsion), that is deposited followed e.g. by drying to remove the water, and by any reaction/crosslinking if needed. In particular embodiments, first adhesive 20 and second adhesive 40 may be solvent coated—that is, each adhesive may be solubilized in an appropriate solvent (or solvent mixture) to form a coating solution that may be coated onto release liner 10 followed by removal of the solvent(s), and by any reaction/crosslinking etc. if needed. In other words, a coating solution of each adhesive may be formed by dissolving the elastomer(s) (and tackifier(s) if present) in a solution, along with any other desired additives or ingredients, with one or more solvents that can adequately solubilize the ingredients. In such embodiments, the precursor flowable liquids for the first and second adhesives by definition are not 100% solids compositions (e.g., hot melt coatable and/or extrudable compositions) and the resulting article comprises a solvent-coated adhesive layer rather than e.g. a hot-melt-coated layer or extruded layer.

Each stripe of an adhesive can be formed by expelling the precursor flowable liquid (e.g., coating solution) through an opening in a coating die, onto a moving surface 11 of release liner 10. Multiple stripes of e.g. first adhesive 20 can be obtained by simultaneously expelling the first coating solution through multiple, laterally-spaced openings of the die, which may be achieved e.g. by the use of a slot die with one or more shims provided therein to block off portions of the slot and to leave other portions of the slot open for the coating solution to pass therethrough. The same can be done for second adhesive 40 (so that the streams of the first liquid, and the streams of the second liquid, are expelled simultaneously from the various openings, and so that the streams of both liquids land essentially simultaneously on the surface of the substrate). Generally alternating stripes of first adhesive 20 and second adhesive 40 may be achieved by variations on the above general approaches. For example, an approach may be used in which the first and second coating solutions are fed (e.g. from first and second separate manifolds) to a dual layer slot die, in an arrangement in which each solution passes through a shim with laterally spaced-apart openings that dictate the nominal thickness, lateral width, and lateral pitch (center-to-center distance) of the stripes of that adhesive. The two shims can be registered relative to each other so that so that the stripes of the two adhesives are generally alternating as desired. Such arrangements are described in e.g. U. S. Patent Application Publication 2009/0162595 to Ko.

It will be appreciated that this is merely one example and that many possible variations exist of this general approach of delivering precursor flowable liquids (e.g., coating solutions) through a die onto surface 11 of moving release liner 10 to form generally alternating stripes of first and second adhesives. In general, some such processes may involve configurations in which a coating die is positioned relatively far from release liner 10 (e.g., in so-called extrusion coating or curtain coating). Some such processes may use e.g. a drop die, for example a multiple-orifice drop die as disclosed in U.S. Patent Application Publication 2002/0108564 to Gruenewald. Or, some such processes may involve situations in which the coating die is positioned in close proximity to release liner 10 (e.g., so-called contact coating). As mentioned, a dual-layer slot die may be used in which two shims (that are registered with each other) are used to respectively control the flow of the two liquids to be coated. Or, the set of shims might be integrated together into a single uniform piece (e.g., in the manner mentioned in U.S. Patent Application Publication 2009/0162595 to Ko). Still further, the shims and/or flow passages might be e.g. machined into the die so as to be integrated as part of the die itself, again as mentioned by Ko. The dimensions of the openings through which the streams are expelled, the flowrates of the various streams, and so on, can be manipulated so as to deposit the various streams at desired thicknesses so as to achieve any desired thickness of the resulting adhesive stripes. Likewise, the placement and dimensions of the openings can be manipulated so as to provide adhesive-free gaps between at least some of the resulting adhesive stripes, as desired.

In some embodiments, the deposited stripes of precursor flowable liquid (e.g. coating solution) may, before any significant evaporation of solvent and/or solidification of the coated material has occurred, pass through a thickness-control gap between release liner 10 and a thickness-control member, e.g. in similar manner as described in U.S. Pat. No. 6,803,076 to Loukusa. Such an arrangement might be used e.g. to reduce the thickness of at least some of the stripes, to minimize variations in the thickness of individual stripes and/or to reduce variation between the thickness of different stripes, or in general to control or modify the thickness of any of the stripes in any useful manner. Such a process might also be used to promote e.g. lateral spreading of one or more of the stripes, and so on. Such a thickness-control member might be e.g. a rod, a knife, a roller, a blade, or a die lip (e.g. positioned downweb along the path of release liner 10 from the die openings). In some embodiments, a moving fluid may be impinged onto the deposited stripes to similar effect, e.g. by use of an air-knife positioned downweb of the coating die. In other embodiments, no such passing of the deposited stripe through such a thickness-control gap, and/or use of an air-knife, may occur.

The above operations may be conveniently done by simultaneously depositing all of the stripes of first and second adhesives 20 and 40 onto release liner 10, in a single pass of release liner 10 past a coating die. Such simultaneous coating operations may be distinguished from e.g. coating operations in which one or more stripes or layers of one adhesive are deposited in a first pass, and one or more stripes or layers of a second adhesive are deposited in a second pass. They may also be distinguished from e.g. non-simultaneous (sequential) coating of two different adhesives (in e.g. stripes or layers), even if such sequential coatings are performed in-line in the same coating line.

Regardless of the particular manner in which precursor flowable liquids (e.g. coating solutions) are delivered to surface 11 of moving release liner 10, in any such approach each precursor liquid is deposited (coated) onto surface 11 of release liner 10 as a stripe that is elongated in the direction of motion of release liner 10. The solvent(s) can then be removed (e.g., by passing release liner 10 through an oven) to leave behind each dried adhesive composition as an elongated stripe of the final desired thickness, width, pitch, and so on. Of course, if any reactive/functional components are present in the precursor liquid, they may react, polymerize, etc., to provide the final desired product, either instead of, or in addition to, any solidification that occurs by way of removal of a coating solvent or of water. Such reaction may be promoted by e.g. temperature, radiation, or any commonly used method.

It will be appreciated that various parameters in the solidification (e.g., drying and/or curing) process may be usefully controlled as desired. In particular, the dwell time of the precursor flowable liquid in a relatively low-viscosity condition may be controlled so as to promote (and/or to limit) the presence and/or amount of any lateral displacement of a precursor stripe by the lateral edges of a laterally-adjacent precursor stripe. (Based on the discussions above, it will be appreciated that this may allow the degree of silicone enrichment in the resulting adhesive layer to be advantageously manipulated.) Thus for example, the distance from the coating die to any drying oven, the speed at which the release liner is moving, the temperature of the oven, and so on, can all be controlled as desired.

Liquid-coating has been found to play a useful role in the herein-described silicone enrichment (i.e., the ability to provide a higher area fraction of silicone-based adhesive against the release liner surface than is present in the bulk adhesive). As is known by the skilled artisan, fluorinated surfaces such as e.g. fluorosilicones are very low in surface energy (i.e., they may exhibit surface energies that may be in the teens, or even in single digits, in dynes/cm). Such surfaces are thus expected to be difficult to wet, particularly by liquids that have comparatively high surface energies (e.g., liquids comprising high-surface-energy-imparting polar groups).

As documented in the Working Examples herein, commonplace organic polymeric adhesives 40 may be coated out of very non-polar coating solutions (e.g., out of toluene and the like). In contrast, silicone-based adhesives 20, particularly those comprising polar moieties (e.g., urea linkages, polyoxamide linkages, and so on), are often coated out of coating solutions that are considerably more polar (e.g., a mixture of isopropyl alcohol and toluene for exemplary silicone-polyurea materials, and a mixture of isopropyl alcohol, ethyl acetate, and toluene for exemplary silicone-polyoxamide materials). It would thus be expected that relatively non-polar coating solutions (e.g., comprising toluene as the only solvent) would be more able to wet such a low energy surface as fluorosilicone surface 11 of release liner 10, in comparison to coating solutions comprising appreciable amounts of e.g. isopropyl alcohol and/or ethyl acetate. However, as documented in the Working Examples herein, the inventors have consistently been able to obtain enrichment of silicone-based adhesive 20 at the fluorosilicone surfaces of release liners. This indicates that the coating solutions of the silicone adhesives may be able to preferentially displace the coating solutions of the organic polymeric adhesives on the surface of the fluorosilicone release liner, even though the coating solutions of the silicone-based adhesives should have a higher surface energy than those of the organic polymeric adhesives. Based on these factors, the herein-described silicone enrichment would be unexpected to the skilled artisan.

It should be noted that it is possible that at least some of any such displacement of the organic polymeric adhesive coating solution by the silicone-based adhesive coating solution might occur in the later stages of the process, e.g. after significant portions of the solvent(s) have been removed from the respective coating solutions. As such, it might be conjectured that a lower surface energy of the silicone-based adhesive itself (in comparison to that of the organic polymeric adhesive) might play a role. However (possibly due to an effect in which the presence in the silicone adhesives of high-surface-energy imparting polar moieties such as urea or oxamide linkages, etc., may somewhat offset the low surface energy of e.g. polysiloxane portions of the silicone adhesives), the surface energies of exemplary silicone-based adhesives comprising such polar moieties have not been found to be significantly lower than the surface energy of exemplary organic polymeric adhesives. Specifically, surface energies in the range of 34 dyne/cm have been found for exemplary silicone-based adhesives, versus in the range of 39 dyne/cm for exemplary organic polymeric adhesives (both of which are far above the surface energy of typical fluorosilicone surfaces).

Thus, the silicone surface-enrichment that is described herein and that is documented in numerous Working Examples, remains a surprising result that would not be expected based on the properties of the various adhesives themselves and/or their precursor coating solutions, or on the properties of fluorinated release liners. Nor would it be expected based on the known behavior of e.g. die-coating operations as customarily performed by those of skill in the art.

Once the coating/solidification is process is complete (that is, when stripes of adhesive 20 and 40 are in their final form so as to collectively comprise adhesive layer 5 upon major surface 11 of release liner 10), release liner 10 bearing adhesive layer 5 thereupon can be e.g. wound and stored as a continuous roll until ready for further processing. In such case, release liner 10 may comprise a release coating, e.g. a fluorosilicone release coating, on surface 12 to ensure that the roll can be unwound as desired. Or, release liner 10 bearing adhesive layer 5 thereupon can be further processed without being rolled up and/or stored, as desired. In any case, in some embodiments adhesive layer 5 can be adhesively bonded (e.g., laminated) to substrate 80 e.g. to form a pressure-sensitive adhesive tape. In some embodiments such an adhesive tape can be a single-faced (sided) tape. In other embodiments, a second adhesive layer 115 (and a second release liner 110, if desired) can be laminated to the opposite side of substrate 80, to form a double-faced adhesive tape. If desired, substrate 80 can be highly extensible so that the formed tape (whether single or double faced) can serve as a stretch-releasable adhesive tape.

Although the discussions herein have focused on the bonding of adhesive layer 5 to e.g. a mounting surface of a building component (e.g. a painted surface), it will be appreciated that adhesive layer 5 may be bonded to any surface as desired. Adhesive layer 5 may be particularly suited for mounting surfaces comprising relatively high hydrophilicity (e.g., glass, ceramics, and so on) and/or surfaces that are in environments subject to high humidity (e.g., restrooms, kitchens, and so on). Various uses for adhesive layers are discussed in further detail in U.S. Pat. No. 8,334,037 (Sheridan).

LIST OF EXEMPLARY EMBODIMENTS

Embodiment 1

An article comprising: a first release liner comprising a fluorosilicone release surface on at least a first major surface thereof; a primary adhesive layer disposed on the first major surface of the release liner, wherein the primary adhesive layer comprises a plurality of stripes of a first pressure-sensitive adhesive and of a second pressure-sensitive adhesive, arranged in a generally alternating pattern across a lateral extent of the release liner; wherein the first pressure-sensitive adhesive is a silicone-based pressure-sensitive adhesive that comprises a silicone block copolymer elastomer comprising hard segments that each comprise at least one polar moiety, wherein the second pressure-sensitive adhesive is an organic polymeric pressure-sensitive adhesive, wherein the first pressure-sensitive adhesive provides a volume fraction of the primary adhesive layer that is from greater than 11%, to about 80%; and wherein the primary adhesive layer exhibits an Elevated Humidity/Static Shear Test result of >30000 minutes.

Embodiment 2

The article of embodiment 1, wherein the silicone block copolymer elastomer is selected from the group consisting of urea-based silicone block copolymers, oxamide-based silicone block copolymers, amide-based silicone block copolymers, and urethane-based silicone block copolymers, and mixtures and blends thereof.

Embodiment 3

The article of any of embodiments 1-2, wherein the silicone-based pressure-sensitive adhesive further comprises a functional MQ tackifying resin.

Embodiment 4

The article of any of embodiments 1-3, wherein the organic polymeric pressure-sensitive adhesive comprises an organic elastomer selected from the group consisting of styrenic block copolymer elastomers, natural rubber elastomers, (meth)acrylate elastomers, and mixtures and blends thereof.

Embodiment 5

The article of any of embodiments 1-4, wherein at least selected stripes of the plurality of stripes each comprise a first major surface that is in contact with the fluorosilicone release surface of the first release liner, and wherein at least selected stripes of the plurality of stripes each comprise a second, oppositely-facing major surface that is adhesively bonded to a first major side of a tape backing.

Embodiment 6

The article of any of embodiments 1-5 wherein at least some of the stripes of the first pressure-sensitive adhesive each comprise a first major surface that is in contact with the fluorosilicone release surface of the first release liner and a second, oppositely-facing major surface that is adhesively bonded to a first major side of a tape backing.

Embodiment 7

The article of any of embodiments 1-6, wherein the tape backing is a highly extensible backing and wherein the tape backing and the primary adhesive layer collectively provide a length of stretch-releasable adhesive tape.

Embodiment 8

The article of embodiment 7, wherein the length of stretch-releasable adhesive tape comprises a long axis that is a stretch-release activation axis of the stretch-releasable adhesive tape and wherein at least selected stripes of the plurality of stripes each comprise a long axis that is oriented at least generally perpendicularly to the stretch-release activation axis of the stretch-releasable adhesive tape.

Embodiment 9

The article of any of embodiments 1-8, wherein first major surfaces of at least selected stripes are configured to be pressure-sensitive-adhesively bonded to a surface of a building component upon removal of the first release liner.

Embodiment 10

The article of any of embodiments 1-9, further comprising a secondary adhesive layer disposed on a second major side of the tape backing that is oppositely-facing from the first major side of the tape backing, wherein the tape backing and the primary and secondary adhesive layers collectively provide a double-faced adhesive tape.

Embodiment 11

The article of embodiment 10, further comprising a secondary release liner disposed in contact with the secondary adhesive layer, and wherein a visible surface of the first release liner comprises an indicia indicating that the first release liner is disposed on the major side of the double-faced adhesive tape that is configured to be bonded to a surface of a building component upon removal of the first release liner.

Embodiment 12

The article of any of embodiments 1-11, wherein at least selected pairs of laterally adjacent stripes of the first pressure-sensitive adhesive and the second pressure-sensitive adhesive each comprise a gap between the first pressure-sensitive adhesive stripe of the pair and the second pressure-sensitive adhesive stripe of the pair, which gap comprises an exposed fluorosilicone release surface that is not in contact with any pressure-sensitive adhesive.

Embodiment 13

The article of any of embodiments 1-12, wherein at least selected pairs of laterally adjacent stripes of the first pressure-sensitive adhesive and the second pressure-sensitive adhesive each comprise a minor surface of a lateral edge of the first pressure-sensitive adhesive stripe of the pair that is in generally lateral contact with a minor surface of a lateral edge of the second pressure-sensitive adhesive stripe of the pair.

Embodiment 14

The article of any of embodiments 1-13, wherein at least selected pairs of laterally adjacent stripes of the first pressure-sensitive adhesive and the second pressure-sensitive adhesive are each configured so that a lateral edge portion of the first pressure-sensitive adhesive stripe of the pair comprises a first major surface that is in contact with the fluorosilicone release surface and so that the lateral edge portion further comprises a second, generally oppositely-facing major surface that is in contact with a major surface of a lateral edge portion of the second pressure-sensitive adhesive stripe of the pair, which lateral edge portion of the first pressure-sensitive adhesive stripe inwardly underlies the lateral edge portion of the second pressure-sensitive adhesive stripe.

Embodiment 15

The article of embodiment 14, wherein the first pressure-sensitive adhesive stripe comprises a laterally-central portion with a second major surface that faces generally opposite the first major surface of the first pressure-sensitive adhesive stripe, which second major surface of the laterally-central portion of the first pressure-sensitive adhesive stripe is not in contact with the second pressure-sensitive adhesive stripe.

Embodiment 16

The article of embodiment 15 wherein at least a part of the lateral edge portion of the first pressure-sensitive adhesive stripe comprises a thickness that is less than about 20% of an average thickness of the laterally-central portion of the first pressure-sensitive adhesive stripe.

Embodiment 17

The article of any of embodiments 15-16, wherein the lateral edge portion of the first pressure-sensitive adhesive stripe comprises an average lateral width that is at least 20% of an average lateral width of the laterally-central portion of the first pressure-sensitive adhesive strip.

Embodiment 18

The article of any of embodiments 1-17, wherein: the first pressure-sensitive adhesive provides a release-liner-side area fraction on the first release liner-facing surface of the primary adhesive layer and provides an opposite-side area fraction on the surface of the primary adhesive layer that is opposite the first release liner, and wherein the primary adhesive layer exhibits a silicone surface-enrichment factor that is the ratio of the release-liner-side area fraction of the first pressure-sensitive adhesive to the opposite-side area fraction of the first pressure-sensitive adhesive, and wherein the silicone surface-enrichment ratio is at least about 1.2.

Embodiment 19

The article of embodiment 18, wherein the silicone surface-enrichment ratio is at least about 1.6.

Embodiment 20

The article of any of embodiments 1-19, wherein the first pressure-sensitive adhesive provides a volume fraction of the primary adhesive layer that is from about 13% to about 70%.

Embodiment 21

The article of any of embodiments 1-20, wherein the first pressure-sensitive adhesive provides a volume fraction of the primary adhesive layer that is from about 15% to about 60%.

Embodiment 22

The article of any of embodiments 1-21, wherein the first pressure-sensitive adhesive provides an overall area fraction, on a surface of the primary adhesive layer that is opposite the first release liner, of from greater than about 20%, to about 70%.

Embodiment 23

The article of any of embodiments 1-22, wherein the first pressure-sensitive adhesive provides an overall area fraction, on a surface of the primary adhesive layer that is opposite the first release liner, of from greater than about 20%, to about 60%.

Embodiment 24

The article of any of embodiments 1-23, wherein the first pressure-sensitive adhesive provides an overall area fraction, on a surface of the primary adhesive layer that is opposite the first release liner, of from about 25% to about 50%.

Embodiment 25

The article of any of embodiments 1-24, wherein the primary adhesive layer comprises a gap area fraction of from about 20% to about 50%.

Embodiment 26

A method of making an article, the method comprising: simultaneously expelling a first precursor coating solution of a first pressure-sensitive adhesive through a first set of multiple, laterally-spaced-apart openings in a coating die and a second precursor coating solution of a second pressure-sensitive adhesive through a second set of multiple, laterally-spaced-apart openings in the same coating die, wherein the openings of the first set and the openings of the second set are arranged in a generally alternating pattern with each other so that generally-alternating streams of the first and second precursor liquids are expelled therefrom and are deposited onto a fluorosilicone release surface of a release liner that is continuously moving past the coating die; removing solvent from the deposited first and second precursor coating solutions so as to solidify the first precursor coating solution into the first pressure-sensitive adhesive and to solidify the second precursor coating solution into the second pressure-sensitive adhesive, thereby forming generally alternating stripes of the first and second pressure-sensitive adhesives on the release liner, wherein the first pressure-sensitive adhesive is a silicone-based pressure-sensitive adhesive that comprises a silicone block copolymer elastomer comprising hard segments that each comprise at least one polar moiety, and the second pressure-sensitive adhesive is an organic polymeric pressure-sensitive adhesive.

Embodiment 27

The method of embodiment 26, further comprising the step of contacting major surfaces of the generally alternating stripes of the first and second pressure-sensitive adhesives, which major surfaces face oppositely from the fluorosilicone release liner, to a highly extensible tape backing and bonding the stripes of the first and second pressure-sensitive adhesive to the highly extensible tape backing to form a stretch-releasable tape article.

Embodiment 28

The article of any of embodiments 1-25, made by the method of any of embodiments 26-27.

EXAMPLES

Test Procedures

Test procedures used in the Examples include the following.

Measurement of Stripe Parameters

To perform thickness measurements of stripes, samples were cut with a sharp razorblade at random locations and thicknesses determined optically via an Olympus Optical Microscope. All measurements were recorded in mils (thousandths of an inch).

Stripe width, stripe pitch (center-to-center distance), and gap width (i.e., the distance between the nearest edges of any two neighboring stripes of differing composition, or between the nearest edges of any two neighboring sub-stripes of the same composition) were measured using an Olympus Optical Microscope. At least three measurements were taken at random locations on the sample and averaged. In more detail, the width of stripes with gaps therebetween (e.g. that resembled the exemplary depiction of FIG. 1) could be easily measured. The width of stripes that had lateral edges that contacted each other, but that did not exhibit significant silicone enrichment (e.g., stripes that resembled the exemplary depiction of FIG. 5) could likewise be easily measured since the interfaces between adjacent stripes could be readily identified. Even for samples in which substrate-side silicone enrichment occurred (e.g. that resembled the exemplary depiction of FIG. 6), it was usually possible to obtain the substrate-side and opposite-side stripe widths by optical inspection. That is, with backlit samples, areas in which the lateral portions of two adhesive stripes of adhesive overlapped (i.e., area $w_{1e}$ as shown in FIG. 6) typically exhibited at least a slight opacity or whitening (thought to be caused by slight interfacial effects between the two adhesives) in comparison to the relatively transparent stripes of each adhesive. So, for any given stripe of e.g. first adhesive 20, optical inspection could usually provide the liner-side width of the stripe (corresponding to $W_{1c}+w_{1e}+w_{1e}$) and also the opposite-side width of the stripe (corresponding to $W_{1c}$).

As mentioned, the opposite-side width of a stripe was usually measured by optical inspection of that surface of the stripe; that is, it usually corresponded to $W_{1c}$ as shown in FIG. 1. The exception was cases in which slight surface-enrichment was present at the opposite side of the stripe (as illustrated in the exemplary embodiment of FIG. 8). In such cases, the minimum width of the stripe (as denoted by the double-headed arrow in FIG. 8) was used as the opposite-side width $W_{1c}$. Such minimum widths could be obtained by e.g. cutting cross-sectional samples in similar manner as described above for obtaining stripe thicknesses.

Area Fractions and Volume Fractions

The various area fractions described herein could be straightforwardly calculated from the average widths of the stripes (and gaps if present). By way of a specific example, for a 20/(40/40) . . . pattern that included gaps between the various stripes, and sub-stripes, such calculations would take into account the area contributions of one 20 stripe, two 40 stripes, and three gaps. As discussed in detail earlier herein, the overall area fraction parameter for an adhesive included the effect of any gaps present, while the adhesive-only area fraction was indicative of the relative area proportions of the first and second adhesives on an adhesive-only basis, irrespective of the presence or absence of gaps. (In designs in which no gaps were present, the "adhesive-only" and "overall" area fractions were substantially equal to each other; that is, in such cases they could be considered to be equivalent to each other.) For adhesive layers with silicone enrichment (e.g., of the general type shown in FIGS. 6-7), the liner-side stripe width and the opposite-side stripe width could be obtained as discussed above, and could then be used to calculate the liner-side and opposite-side area fractions. (Since no gaps were present, each such area fraction could be equivalently considered to be an adhesive-only and an overall area fraction).

Volume fractions could also be straightforwardly calculated from the average widths of the stripes (and gaps if present), by further taking into account the thicknesses of the adhesive stripes (and of any gaps therebetween). As mentioned previously, gaps that were located in between neighboring stripes of differing thicknesses were assumed to have thicknesses that were halfway between the thicknesses of the neighboring stripes, for purposes of calculation. Volume fractions for samples in which silicone enrichment was present (Tables 3 and 4) were calculated based on the opposite-side widths/areas of the respective stripes, with a +5% correction factor applied thereto based on the known silicone enrichment at the liner side. These volume fractions are marked accordingly in Tables 3 and 4.

Elevated Humidity/Static Shear Test Method

Drywall panel substrates (as obtained e.g. from Materials Co, Metzger Building, St. Paul, Minn.) were painted with Behr Premium Plus Ultra Interior Flat (color: Egyptian Nile) or Sherwin-Williams Duration Interior Acrylic Latex Matte (color: Ben Bone). These paints are believed to be representative of so-called architectural paints and are believed to meet the criteria for such paints that are described elsewhere herein. Those of skill in the art will appreciate that any such paint meeting these criteria can be used equivalently.

The procedure for painting drywall with the Behr Premium Plus Ultra Interior Flat paint was as follows: the paint can was placed on a paint roller for mixing, for at least 24 hours before the application. Then, a first coat was applied with a conventional painting roller (as are all other applications of paint described herein), and was allowed to dry for at least 24 hours under ambient conditions (noting that the ambient conditions may not necessarily be actively controlled, but will often be in the range of approximately 22° C./50% relative humidity). After that, a second coat was applied and allowed to dry for at least 24 hours under ambient conditions. Thereafter, the painted substrates were held for approximately 7 days at 50° C. in a forced air oven. After this, they were stored under ambient conditions until used for a static shear test.

The procedure for painting drywall with Sherwin-Williams Duration Interior Acrylic Latex Matte paint was as follows: the paint can was placed on a paint roller for mixing, for at least 24 hours before the application. A primer coat (Sherwin Williams PROMAR 200 Zero VOC Interior Latex Primer B28 W8200 6501-33259) was applied to the drywall substrate. The primer coat was allowed to dry for at least 24 hours at ambient conditions. After that, a first coat of the paint was applied and allowed to dry for at least 24 hours at ambient conditions. After that, a second coat of the paint was applied and allowed to dry for at least 24 hours at ambient conditions. Thereafter, the painted substrates were held for approximately 7 days at 50° C. in a forced air oven. After this, they were stored under ambient conditions until used for a static shear test. (While considerable details of the above procedures have been provided, it will be appreciated that any generally equivalent procedure may be used.)

Static shear of a primary adhesive layer that was bonded to a painted substrate was determined in generally similar manner to the procedures outlined in ASTM Test Method D3654-82 entitled, "Holding Power of Pressure-Sensitive Tapes," with the following modifications. The primary adhesive layer as provided comprised a release liner, e.g. a fluorosilicone release liner, on a first side/surface of the adhesive layer (the side/surface that was to be adhesively bonded to a painted substrate). The second, oppositely-facing side/surface of the adhesive layer had been laminated to a foam backing of the general type described below. On the opposite side of the foam backing a secondary adhesive layer was provided, typically with a release liner thereon. This combination of layers provided a double-faced adhesive article (e.g., of a generally similar type to the exemplary design shown in FIG. 3, although a non-adhesive pull tab portion may not necessarily need to be provided in such a test article). It is noted that the secondary adhesive layer may or may not be similar or identical to the primary adhesive layer and it is further noted that the particular construction of the backing and the secondary adhesive layer are not critical as long they hold sufficiently well to allow the test of the adhesion of the primary adhesive layer to the painted surface to be performed.

A test sample of such an adhesive article, having dimensions of approximately 1.6 cm×5.1 cm, was adhesively bonded to the painted substrate under ambient conditions by removing the release liner from the first side/surface of the primary adhesive layer and pressing this first side/surface against the painted substrate. With the second-side release liner still in place, a 6.8 kg hand held roller was rolled over the length of the sample two times at an approximate rate of 30 cm/min. The second-side release liner was removed to expose the secondary adhesive layer, and the back plate of a medium size 3M Command Hook (Cat. 17001) was manually pressed against the surface of the secondary adhesive layer. The nominal bonding area (irrespective of gaps) of the adhesive layer to the painted substrate and the back plate was approximately 8.2 square cm.

The test sample was allowed to dwell on the painted substrate for 1 hour under ambient conditions. The painted substrate (often with multiple test samples bonded to it) was vertically mounted in a custom-made fixture positioned within a humidity controlled chamber at approximately 21° C. and 75% relative humidity. The Command hook was then attached to the back plate and a 1.36 kg weight was hung from the hook. The samples were held in this condition and the time to failure was recorded. At least three samples were tested for each adhesive layer and the arithmetic average time to failure recorded. The test was typically run to a maximum of 30000 minutes; a value is reported with a greater than symbol (e.g., >) when at least one of the three samples has not failed at the time the test was terminated.

Materials

Release Liner and Tape Backing

Fluorosilicone release liner of the general type designated as SYL-OFF Q2-7785, and multilayer composite foam laminate backing (thickness approximately 36 mils), were obtained, of the types described in the Examples section of U.S. Pat. No. 8,344,037 (Sherman).

Organic Polymeric Pressure-Sensitive Adhesive Coating Solution

An organic polymeric pressure-sensitive adhesive composition comprising styrene-butadiene-styrene block copolymer elastomers was prepared generally according to composition D of U.S. Pat. No. 6,231,962 (Bries). The solution as prepared comprised this adhesive composition at approximately 43 wt. % (total) solids in toluene, and was diluted with toluene to approximately 35% solids to form a coating solution. The coating solution exhibited a viscosity (Brookfield LVT, #3 spindle, 6 rpm, for this and all other viscosities listed here) in the range of approximately 1500 cP. This adhesive was designated as PSA-O-1. All stripes of organic polymeric adhesive in the following Working Examples used this adhesive.

Silicone-Based Pressure-Sensitive Adhesive Coating Solution—SPU

A pressure-sensitive adhesive composition was prepared that comprised a silicone-polyurea (SPU) elastomer in combination with a functional MQ resin. The composition was prepared generally according to Example 27 of U.S. Pat. No. 6,569,521 (Sheridan), with the difference that the ratio of components was altered to achieve a pressure-sensitive adhesive composition with MW PDMS diamine/moles Dytek A polyamine/% by weight MQ resin of 33000/0.5/50 (that is, with the silicone-polyurea elastomer and the MQ resin being at an approximately 50/50 weight ratio). The coating solution comprised this adhesive composition at approximately 30 wt. % total solids in a 70/30 (wt. %) blend of toluene/isopropanol. The coating solution exhibited a viscosity of approximately 8700 cP. This adhesive was designated as PSA-S-1.

Silicone-Based Pressure-Sensitive Adhesive Precursor Coating Solution—SPOx

A pressure-sensitive adhesive composition was obtained that comprised a silicone-polyoxamide (SPOx) elastomer in combination with a functional MQ resin. The silicone-polyoxamide elastomer was believed to be similar in structure and properties to the elastomer described as "PSA 2" in the Working Examples of U.S. Patent Application Publication No. 2009/0229732 (Determan). The functional MQ resin was procured from GE under the trade designation SR-545 (as was the MQ resin used in PSA-S-1). The silicone-polyoxamide elastomer and the MQ resin were at a 50/50 weight ratio. The coating solution comprised this adhesive composition at approximately 35 wt. % total solids in a 60/20/20 (wt. %) blend of ethyl acetate/isopropanol/toluene. The coating solution exhibited a viscosity of approximately 7600 cP. This adhesive was designated as PSA-S-2. All of the stripes of silicone-based adhesives in the following Tables of Working Examples used this silicone-based adhesive, except for those Examples specifically noted as using PSA-S-1.

Coating Process

Representative Coating Process

The coating solutions were wet coated on the SYL-OFF Q2-7785 release liner in stripes using a dual layer slot die. The two layers of the slot die were fed from separate manifolds (one to feed a first coating solution, the other to feed a second coating solution, with separate shims being provided for each manifold/slot layer). Each shim comprised openings of desired width and spacing to expel coating solution therethrough so as to form stripes of that coating solution of the desired width and pitch. The two shims were registered in relation to each other so as to deposit stripes in a generally alternating pattern as desired. In typical experiments, the total width of the coating area was approximately 2 inches.

Representative experiments were conducted with a first coating solution comprising PSA-O-1 (organic polymeric adhesive) and with a second coating solution comprising PSA-S-1 (silicone-based adhesive). The two coating solutions were fed to their respective slot layers at a feed rate of approximately 22 cc/min (in a few cases, the flowrate of the PSA-S-1 coating solution was kept at 22 cc/min and the flowrate of the PSA-O-1 coating solution was increased to 44 cc/min). Coating experiments were done at various line speeds, including 10, 20, 30, 40 and 50 feet per minute. After coating, the stripe-coated release liner was passed through a 3-zone forced air oven with zones operating respectively at approximately 57° C., 74° C. and 85° C. zone temperatures to yield a dry coating of the pressure-sensitive adhesive. After drying, the release liner, bearing the dried adhesive layer on the fluorosilicone release surface thereof, was rolled up and stored at ambient conditions until used.

Variations

Numerous variations of the above Representative Coating Process were done, including experiments with PSA-S-2 as the second coating solution. The method in which the coating solutions were delivered were also varied; e.g., apparatus was used in which flow passages were integrated as part of the die itself (in generally similar manner to the arrangements described previously herein), and in which the number and design of die shims were varied. It is believed that these variations in the particular manner in which the coating solutions were passed through the interior of the die did not significantly affect the behavior of the coating solutions once the solutions were coated on the release liner. That is, they did not appear to significantly affect the herein-described preferential flow/wetting and displacement of one coating solution by another.

Converting

A release liner bearing a primary adhesive layer thereon was typically stored in roll form until used. Then, the liner was unrolled (to expose the surface of the primary adhesive opposite the release liner) and the exposed surface of the primary adhesive layer was laminated to a foam backing. The layers were arranged so that the long axes of the adhesive stripes were oriented perpendicularly to the long axis of the foam backing (e.g., in similar manner as shown in FIG. 3), unless otherwise noted. A secondary adhesive layer (bearing a secondary release liner) was then laminated to the opposite side of the foam backing. Often the secondary adhesive layer was a continuous coating of the organic polymeric adhesive of Comparative Example PSA-O-1 (described below).

The thus-formed double-faced adhesive article could then be stored until used.

EXAMPLES

Single-Adhesive Comparative Examples

Comparative Example PSA-O-1 comprised a continuous coating of PSA-O-1 (organic polymeric adhesive). To do this, the coating solution was expelled from the die-slot openings in discrete streams, but the flowrate of coating solution was such, and the release liner passed by the die in such manner, that the deposited stripes laterally merged with each other to form a continuous coated layer. Comparative Example PSA-O-1, when tested in the Elevated Humidity/Static Shear Test Method, exhibited a test result (time to failure) of approximately 2500 minutes.

Comparative Example PSA-S-2 comprised a continuous coating of PSA-S-2 (silicone-based adhesive in which the silicone elastomer was a silicone polyoxamide), coated in generally similar manner as Comparative Example PSA-O-1. Comparative Example PSA-S-2, when tested in the Elevated Humidity/Static Shear Test Method, exhibited a test result (time to failure) of >30000 minutes. Although not included herein as a specific Comparative Example, it is noted that continuous coatings of PSA-S-1 (silicone-based adhesive in which the silicone elastomer was a silicone polyurea) had similarly been found to meet the >30000 minute threshold in such testing.

Stripe-Coated Working Examples

In order to save space in the Tables, it is stipulated that all Working Examples in the following Tables exhibited a result of >30000 minutes in an Elevated Humidity/Static Shear Test, excepting Comparative Examples C1, C2 and C3 as specifically discussed below. Also, in all Examples the silicone-based adhesive was PSA-S-2 (in which the silicone elastomer was a silicone polyoxamide) unless specifically indicated. To save space in the following Tables, the following abbreviations are used in the Tables:

| Key | | |
|---|---|---|
| Abbreviation | Units | Parameter |
| W-S | Mils | Width of silicone-based adhesive stripes |
| W-O | Mils | Width of organic polymeric adhesive stripes |
| W-G | Mils | Width of (empty) gap between adhesive stripes |
| T-S | Mils | Thickness of silicone-based adhesive stripes |
| T-O | Mils | Thickness of organic polymeric adhesive stripes |
| P | Mm | Pitch, in mm |
| OAF-S | % | Overall area fraction, silicone adhesive |
| OAF-O | % | Overall area fraction, organic polymeric adhesive |
| GAF | % | Gap area fraction |
| W-S (LS) | Mils | Width of silicone-based adhesive stripes (liner side) |
| W-S (OS) | Mils | Width of silicone-based adhesive stripes (opposite side) |
| W-O (LS) | Mils | Width of organic polymeric adhesive stripes (liner side) |
| W-O (OS) | Mils | Width of organic polymeric adhesive stripes (opp. side) |
| AF-S (LS) | % | Area fraction, silicone adhesive (liner side) |
| AF-S (OS) | % | Area fraction, silicone adhesive (opposite side) |
| VF-S | % | Volume fraction, silicone adhesive (for selected examples) |

The width (W) and thickness (T) of the various stripes were measured optically as described previously. The pitch (P, reported in mm) was indicative of the overall (average) center-to-center distance between adjacent stripes (and substripes, if present). The stripe pitch was typically fairly uniform with the center-to-center distance between any two specific stripes closely approximating the overall average pitch. For clarity of presentation, in Tables 3 and 4 the widths of the various stripes in the silicone surface-enriched samples are omitted (as are parameters relating to gaps since no gaps were present in these Examples). Area fractions were calculated from the measured stripe widths as described above.

Stripes with Gaps in Between

Table 1 shows parameters for stripes arranged with gaps therebetween (i.e., stripes of the general type illustrated in FIG. 1). In Comparative Examples C1, C2, and C3, and in Working Examples 1-1, 1-2, 1-3, 1-4, 1-5, 1-7, 1-8, 1-10, 1-11, and 1-14, each stripe of silicone-based adhesive was followed by two sub-stripes of organic polymeric adhesive (that is, using the previously-discussed nomenclature, the generally alternating pattern was 20/(40/40)/20/(40/40) . . . ). In Working Examples 1-6, 1-9, 1-12, 1-13, and 1-15, each stripe of silicone-based adhesive was followed by a single stripe of organic polymeric adhesive (that is, using the previously-discussed nomenclature, the generally alternating pattern was 20/40/20/40 . . . ). In Comparative Example C3 and in Working Examples 1-10, 1-12, and 1-15, the silicone-based adhesive was PSA-S-1 (with a silicone-polyurea elastomer); in all others the silicone-based adhesive was PSA-S-2 (with a silicone-polyoxamide elastomer).

TABLE 1

| No. | W-S | W-O | W-G | OAF-S | OAF-O | GAF | T-S | T-O | P | VF-S |
|---|---|---|---|---|---|---|---|---|---|---|
| C1 | 36.2 | 97.7 | 23.9 | 12 | 64 | 24 | 2.0 | 3.4 | 1.7 | 7.5 |
| C2 | 30.4 | 23.0 | 42.7 | 15 | 22 | 63 | 1.4 | 2.5 | 2.0 | 9.9 |
| C3 | 40.4 | 36.2 | 28.9 | 20 | 36 | 43 | 1.4 | 3.5 | 2.1 | 10 |
| 1-1 | 47.7 | 34.6 | 30.4 | 23 | 33 | 44 | 1.7 | 2.8 | 1.7 | 16 |
| 1-2 | 44.1 | 36.9 | 20.7 | 25 | 41 | 35 | 2.3 | 2.8 | 1.6 | 22 |
| 1-3 | 53.1 | 36.0 | 27.2 | 26 | 35 | 39 | 1.7 | 3.0 | 1.8 | 18 |
| 1-4 | 59.4 | 28.1 | 31.0 | 28 | 27 | 45 | 1.9 | 2.9 | 1.7 | 22 |
| 1-5 | 53.1 | 29.3 | 24.0 | 29 | 32 | 39 | 2.6 | 2.7 | 1.5 | 28 |
| 1-6 | 38.1 | 32.2 | 29.7 | 29 | 25 | 46 | 0.7 | 1.0 | 1.7 | 24 |
| 1-7 | 56.7 | 32.3 | 22.8 | 30 | 34 | 36 | 2.6 | 2.4 | 1.7 | 31 |
| 1-8 | 52.5 | 31.0 | 16.0 | 32 | 38 | 30 | 2.2 | 1.3 | 1.4 | 42 |
| 1-9 | 43.7 | 33.6 | 23.0 | 35 | 27 | 37 | 2.4 | 1.5 | 1.7 | 43 |
| 1-10 | 63.9 | 56.6 | 2.5 | 35 | 61 | 4 | 1.2 | 2.0 | 1.6 | 39 |
| 1-11 | 58.3 | 33.1 | 10.6 | 37 | 42 | 20 | 2.2 | 1.5 | 1.4 | 45 |
| 1-12 | 111 | 85.3 | 39.4 | 40 | 31 | 29 | 4.0 | 6.0 | 3.2 | 33 |
| 1-13 | 56.0 | 34.4 | 22.4 | 41 | 25 | 33 | 1.0 | 1.5 | 1.7 | 34 |
| 1-14 | 76.0 | 32.4 | 13.3 | 42 | 36 | 22 | 2.2 | 1.4 | 1.7 | 52 |
| 1-15 | 125 | 85.3 | 23.6 | 48 | 33 | 18 | 3.4 | 5.1 | 2.8 | 40 |

In Table 1, the data is arranged in increasing order of the overall area fraction of silicone-based adhesive (OAF-S). Comparative Examples C1, C2, and C3 (at overall area fractions of silicone-based adhesive of 12, 15, and 20%) respectively exhibited times to failure of 11500 minutes, 8600 minutes, and 4800 minutes, in an Elevated Humidity/Static Shear Test. All other Examples achieved a test result of >30000 minutes.

Stripes without Gaps in Between and without Silicone Surface-Enrichment

Table 2 shows parameters for stripes arranged without gaps therebetween and with lateral sidewalls in generally lateral contact with each other (stripes of the general type shown in FIG. 5). These samples were all of the 20/40/20/40 generally alternating pattern. For these samples (in which no gaps were present), the overall area fraction (OAF) of each adhesive was substantially equivalent to the adhesive-only area fraction of each adhesive.

TABLE 2

| No. | W-S | W-O | OAF-S | OAF-O | T-S | T-O | P | VF-S |
|---|---|---|---|---|---|---|---|---|
| 2-1 | 66.7 | 133.5 | 33 | 67 | 0.8 | 2.7 | 2.5 | 13 |
| 2-2 | 62.5 | 111.2 | 36 | 64 | 0.7 | 1.8 | 2.3 | 18 |
| 2-3 | 108.7 | 94.1 | 54 | 46 | 0.8 | 1.1 | 2.5 | 46 |
| 2-4 | 108.0 | 66.1 | 62 | 38 | 1.2 | 2.2 | 2.3 | 47 |

Stripes with Silicone Surface-Enrichment

Table 3 shows parameters for stripes arranged without gaps therebetween and with surface-enrichment of the silicone-based adhesive being observed at the surface of the adhesive layer that was in contact with the release liner (i.e., stripes of the general arrangement of FIG. 6). These samples were all of the 20/40/20/40 generally alternating pattern. In Table 3, the opposite-side and liner-side area fractions are only listed for the first, silicone-based adhesive. For these samples, the balance of the opposite-side and liner-side area fractions were occupied by the second, organic polymeric adhesive.

TABLE 3

| No. | AF-S (OS) | AF-S (LS) | T-S | T-O | P | VF-S |
|---|---|---|---|---|---|---|
| 3-1 | 33 | 69 | 2.5 | 1.8 | 1.3 | ~42 |
| 3-2 | 46 | 89 | 1.6 | 1.4 | 1.3 | |
| 3-3 | 52 | 77 | 1.1 | 2.2 | 2.1 | |
| 3-4 | 55 | 90 | 2.4 | 1.7 | 1.3 | |
| 3-5 | 56 | 96 | 2.3 | 2.0 | 1.3 | ~61 |

In these data, comparison of the liner-side surface area fraction of silicone adhesive (AF-S(LS)) to the opposite-side fraction of silicone adhesive (AF-S(OS)) reveals the silicone enrichment of the liner-side surface of the adhesive layer that can be achieved if desired. For example, Working Example 3-1 had an opposite-side area fraction of silicone-based adhesive of approximately 33%, and yet the surface of the adhesive layer against the release liner was found to exhibit a silicone adhesive area fraction of approximately 69%, illustrating the ability of the silicone adhesive to preferentially displace the organic polymeric adhesive, at the surface of the adhesive layer that was in contact with the release liner.

To further illustrate the silicone-enrichment phenomenon at the release liner surface, Table 3A presents the actual optically observed widths of the silicone-based adhesive stripes at the release liner surface (W-S(LS)) versus the optically observed widths of these stripes at the opposite surface (W-S(OS)). The widths for the organic polymeric adhesive stripes are also listed in Table 3A. (The surface area fractions of silicone-based adhesive listed in Table 3 were calculated from the width data of Table 3A.) With respect to the aforementioned $W_{1c}$ and $w_{1e}$ parameters, it will be appreciated that the W-S(OS) parameter corresponds to $W_{1c}$ and that the W-S(LS) parameter corresponds to $W_{1c}+w_{1e}+w_{1e}$.

TABLE 3A

| No. | W-S (LS) | W-S (OS) | W-O (LS) | W-O (OS) |
|---|---|---|---|---|
| 3-1 | 73.9 | 35.0 | 32.7 | 71.5 |
| 3-2 | 90.0 | 46.6 | 10.6 | 54.1 |
| 3-3 | 133.2 | 89.5 | 40.6 | 84.3 |
| 3-4 | 94.5 | 57.3 | 10.6 | 47.8 |
| 3-5 | 101 | 58.5 | 4.1 | 46.5 |

Stripes with Complete Silicone Surface-Enrichment

Figure 7:
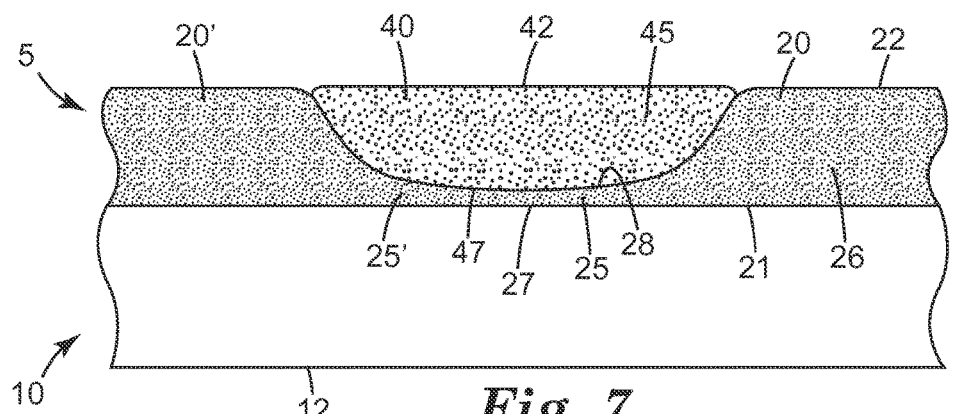
FIG. 7 is a schematic cross sectional slice view of a portion of another exemplary article as disclosed herein.

Table 4 shows parameters for stripes arranged without gaps therebetween and with complete surface-enrichment of the silicone-based adhesive being observed at the surface of the adhesive layer that was in contact with the release liner (i.e., stripes of the general arrangement of FIG. 7). In Table 4, the opposite-side and liner-side area fractions are only listed for the first, silicone-based adhesive. For these samples, the balance of the opposite-side and liner-side area fractions were occupied by the second, organic polymeric adhesive.

TABLE 4

| No. | AF-S (OS) | AF-S (LS) | T-S | T-O | P | VF-S |
|---|---|---|---|---|---|---|
| 4-1 | 48 | 100 | 2.1 | 2.0 | 1.3 |  |
| 4-2 | 51 | 100 | 3.1 | 2.3 | 1.3 |  |
| 4-3 | 53 | 100 | 1.7 | 1.5 | 1.6 |  |
| 4-4 | 57 | 100 | 2.4 | 1.7 | 2.5 | ~69 |
| 4-5 | 58 | 100 | 2.6 | 1.9 | 1.5 |  |
| 4-6 | 61 | 100 | 3.0 | 1.3 | 2.1 | ~82 |

In these data, comparison of the liner-side surface area fraction of silicone adhesive (AF-S(LS)) to the opposite-side fraction of silicone adhesive (AF-S(OS)) reveals the high degree of silicone-enrichment of the liner-side surface that can be achieved if desired. For example, Working Example 4-1 had an opposite-side area fraction of silicone of approximately 48%, and yet the surface of the adhesive layer against the release liner was found to exhibit a silicone area fraction of approximately 100%, indicating that the silicone adhesive had completely preferentially displaced the organic polymeric adhesive at the surface of the adhesive layer that was in contact with the release liner.

Enrichment on the Opposite Surface

It was sometimes found that some silicone enrichment also occurred on the surface of the adhesive layer opposite the release liner (that is, the surface that was exposed to air after deposition of the coating solution on the release liner). Such samples often exhibited an appearance generally similar to that shown in FIG. 8. Typically, the extent of the silicone enrichment on this surface was not as great as that on the release liner surface.

Effect of Orientation of Stripes

All of the above Examples were arranged so that when the primary adhesive layer was adhesively bonded to a backing to form an adhesive article, the long axes of the stripes were oriented perpendicular to the long axis (i.e., the stretch-release axis) of the article. That is, the stripes were oriented as shown in the exemplary illustration of FIG. 3. In additional experiments, some stripes were adhesively bonded (laminated) to tape backings at off-angles (relative to the baseline configuration of FIG. 3) of approximately 30, 45, 60, or 90 degrees. All such samples exhibited times to failure of >30000 minutes in an Elevated Humidity/Static Shear Test.

The foregoing Examples have been provided for clarity of understanding only. No unnecessary limitations are to be understood therefrom. The tests and test results described in the Examples are intended solely to be illustrative, rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary structures, features, details, configurations, etc., that are disclosed herein can be modified and/or combined in numerous embodiments. (In particular, all elements that are positively recited in this specification as alternatives, may be explicitly included in the claims or excluded from the claims, in any combination as desired.) All such variations and combinations are contemplated by the inventor as being within the bounds of the conceived invention not merely those representative designs that were chosen to serve as exemplary illustrations. Thus, the scope of the present invention should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control.

What is claimed is:

1. An article comprising:
    a first release liner comprising a fluorosilicone release surface on at least a first major surface thereof;
    a primary adhesive layer disposed on the first major surface of the release liner, wherein the primary adhesive layer comprises a plurality of stripes of a first pressure-sensitive adhesive and of a second pressure-sensitive adhesive, arranged in a generally alternating pattern along a longitudinal extent of the release liner;
    wherein the first pressure-sensitive adhesive is a silicone-based pressure-sensitive adhesive that comprises a silicone block copolymer elastomer comprising hard segments that each comprise at least one polar moiety,
    wherein the second pressure-sensitive adhesive is an organic polymeric pressure-sensitive adhesive,
    wherein the first pressure-sensitive adhesive provides a volume fraction of the primary adhesive layer that is from greater than 11%, to about 80%;
    and wherein the primary adhesive layer exhibits an Elevated Humidity/Static Shear Test result of >30000 minutes.

2. The article of claim 1, wherein the silicone block copolymer elastomer is selected from the group consisting of urea-based silicone block copolymers, oxamide-based silicone block copolymers, amide-based silicone block copolymers, and urethane-based silicone block copolymers, and mixtures and blends thereof.

3. The article of claim 1, wherein the organic polymeric pressure-sensitive adhesive comprises an organic elastomer selected from the group consisting of styrenic block copolymer elastomers, natural rubber elastomers, (meth)acrylate elastomers, and mixtures and blends thereof.

4. The article of claim 1 wherein at least some of the stripes of the first pressure-sensitive adhesive each comprise a first major surface that is in contact with the fluorosilicone release surface of the first release liner and a second, oppositely-facing major surface that is adhesively bonded to a first major side of a tape backing.

5. The article of claim 1, wherein the tape backing is a highly extensible backing and wherein the tape backing and the primary adhesive layer collectively provide a length of stretch-releasable adhesive tape.

6. The article of claim 5, wherein the length of stretch-releasable adhesive tape comprises a long axis that is a stretch-release activation axis of the stretch-releasable adhesive tape and wherein at least selected stripes of the plurality of stripes each comprise a long axis that is oriented at least generally perpendicularly to the stretch-release activation axis of the stretch-releasable adhesive tape.

7. The article of claim 6, wherein the first major surfaces of at least the selected stripes are configured to be pressure-sensitive-adhesively bonded to a surface of a building component upon removal of the first release liner.

8. The article of claim 7, further comprising a secondary adhesive layer disposed on a second major side of the tape backing that is oppositely-facing from the first major side of the tape backing, wherein the tape backing and the primary and secondary adhesive layers collectively provide a double-faced stretch-releasable adhesive tape.

9. The article of claim 1, wherein at least selected pairs of adjacent stripes of the first pressure-sensitive adhesive and the second pressure-sensitive adhesive each comprise a gap between the first pressure-sensitive adhesive stripe of the pair and the second pressure-sensitive adhesive stripe of the pair, which gap comprises an exposed fluorosilicone release surface that is not in contact with any pressure-sensitive adhesive.

10. The article of claim 1, wherein at least selected pairs of adjacent stripes of the first pressure-sensitive adhesive and the second pressure-sensitive adhesive each comprise a minor surface of an edge of the first pressure-sensitive adhesive stripe of the pair that is in contact with a minor surface of an edge of the second pressure-sensitive adhesive stripe of the pair.

11. The article of claim 1, wherein at least selected pairs of adjacent stripes of the first pressure-sensitive adhesive and the second pressure-sensitive adhesive are each configured so that an edge portion of the first pressure-sensitive adhesive stripe of the pair comprises a first major surface that is in contact with the fluorosilicone release surface and so that the edge portion further comprises a second, generally oppositely-facing major surface that is in contact with a major surface of an edge portion of the second pressure-sensitive adhesive stripe of the pair, which edge portion of the first pressure-sensitive adhesive stripe inwardly underlies the edge portion of the second pressure-sensitive adhesive stripe.

12. The article of claim 11, wherein the first pressure-sensitive adhesive stripe comprises a central portion with a second major surface that faces generally opposite the first major surface of the first pressure-sensitive adhesive stripe, which second major surface of the central portion of the first pressure-sensitive adhesive stripe is not in contact with the second pressure-sensitive adhesive stripe.

13. The article of claim 1, wherein the first pressure-sensitive adhesive provides a release-liner-side area fraction on the first release liner-facing surface of the primary adhesive layer and provides an opposite-side area fraction on the surface of the primary adhesive layer that is opposite the first release liner, and wherein the primary adhesive layer exhibits a silicone surface-enrichment factor that is the ratio of the release-liner-side area fraction of the first pressure-sensitive adhesive to the opposite-side area fraction of the first pressure-sensitive adhesive, and wherein the silicone surface-enrichment ratio is at least about 1.2.

14. The article of claim 13, wherein the silicone surface-enrichment ratio is at least about 1.6.

15. The article of claim 1, wherein the first pressure-sensitive adhesive provides a volume fraction of the primary adhesive layer that is from about 13% to about 70%.

16. The article of claim 1, wherein the first pressure-sensitive adhesive provides a volume fraction of the primary adhesive layer that is from about 15% to about 60%.

17. The article of claim 1, wherein the first pressure-sensitive adhesive provides an overall area fraction, on a surface of the primary adhesive layer that is opposite the first release liner, of from greater than about 20%, to about 70%.

18. The article of claim 1, wherein the first pressure-sensitive adhesive provides an overall area fraction, on a surface of the primary adhesive layer that is opposite the first release liner, of from greater than about 20%, to about 60%.

19. The article of claim 1, wherein the primary adhesive layer comprises a gap area fraction of from about 20% to about 50%.

* * * * *

UNITED STATES PATENT AND TRADEMARK OFFICE
CERTIFICATE OF CORRECTION

PATENT NO. : 10,023,768 B2  
APPLICATION NO. : 14/901271  
DATED : July 17, 2018  
INVENTOR(S) : Carlos Barrios Page 1 of 3

It is certified that error appears in the above-identified patent and that said Letters Patent is hereby corrected as shown below:

In the Specification

Column 5  
Line 2, Delete "$T_{1c}$" and insert -- $T_{lc}$ --, therefor.

Column 6  
Line 53, After "which" delete "is".

Column 8  
Line 54, Delete "$w_{1e}$" and insert -- $w_{le}$ --, therefor.

Column 8  
Line 55, Delete "$w_{1e}$" and insert -- $w_{lc}$ --, therefor.

Column 8  
Line 57, Delete "$w_{1e}$" and insert -- $w_{le}$ --, therefor.

Column 8  
Line 59, Delete "$w_{1e}$" and insert -- $w_{lc}$ --, therefor.

Column 8  
Line 65, Delete "$W_{1e}+w_{1e}+w_{1e.}$" and insert -- $W_{lc}+w_{le}+w_{le.}$ --, therefor.

Column 9  
Line 2, Delete "$W_{1e}+w_{1e})$." and insert -- $W_{lc}+w_{le})$. --, therefor.

Column 9  
Line 3, Delete "$W_{1e.}$" and insert -- $W_{lc.}$ --, therefor.

Signed and Sealed this  
Twenty-sixth Day of March, 2019

Andrei Iancu  
*Director of the United States Patent and Trademark Office*

Column 9
Line 8, Delete "$t_{1e}$" and insert -- $t_{le}$ --, therefor.

Column 9
Line 9, Delete "$T_{1e}$" and insert -- $T_{lc}$ --, therefor.

Column 9
Line 11, Delete "$t_{1e}$" and insert -- $t_{le}$ --, therefor.

Column 9
Line 16, Delete "$t_{1e}$" and insert -- $t_{le}$ --, therefor.

Column 9
Line 17, Delete "$T_{1e}$" and insert -- $T_{lc}$ --, therefor.

Column 11
Line 10, Delete "$(W_{1C})$" and insert -- $(W_{lc})$ --, therefor.

Column 11
Line 29, Delete "moities" and insert -- moieties --, therefor.

Column 11
Line 32, Delete "moities" and insert -- moieties --, therefor.

Column 12
Line 64, After "minimized" insert -- . --.

Column 16
Line 36, After "(II)" insert -- . --.

Column 17
Line 8, Delete "Polvoxamides" and insert -- Polyoxamides --, therefor.

Column 28
Line 21, Delete "moities" and insert -- moieties --, therefor.

Column 28
Line 25, Delete "moities" and insert -- moieties --, therefor.

Column 33
Line 54, Delete "$w_{1e}$" and insert -- $w_{le}$ --, therefor.

Column 33
Line 60, Delete "$W_{1c}+w_{1e}+w_{1e})$" and insert -- $W_{lc}+w_{le}+w_{le})$ --, therefor.

CERTIFICATE OF CORRECTION (continued)
U.S. Pat. No. 10,023,768 B2

Column 34
Line 3, Delete "$W_{1c.}$" and insert -- $W_{lc.}$ --, therefor.

Column 40
Line 54, Delete "$W_{1c}$" and insert -- $W_{lc}$ --, therefor.

Column 40
Line 54, Delete "$w_{1e}$" and insert -- $w_{le}$ --, therefor.

Column 40
Line 55, Delete "$W_{1C}$" and insert -- $W_{lc}$ --, therefor.

Column 40
Lines 56-57, Delete "$W_{1c}+w_{1e}+w_{1e.}$" and insert -- $W_{lc}+w_{le}+w_{le.}$ --, therefor.